(12) United States Patent
Balasubramaniam et al.

(10) Patent No.: US 11,337,057 B2
(45) Date of Patent: May 17, 2022

(54) MULTI-UNIVERSAL SUBSCRIBER IDENTITY MODULE USER EQUIPMENT AND OPERATING METHOD THEREOF

(71) Applicant: SAMSUNG ELECTRONICS CO., LTD., Suwon-si (KR)

(72) Inventors: Mohanraja Balasubramaniam, Bangalore (IN); Nikhil Patni, Bangalore (IN); Rohan Raj, Bangalore (IN); Lalit Kumar Pathak, Bangalore (IN); Tushar Vrind, Bangalore (IN); Lalith Kumar, Bangalore (IN); Mangesh Abhimanyu Ingale, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/870,375

(22) Filed: May 8, 2020

(65) Prior Publication Data
US 2020/0359196 A1    Nov. 12, 2020

(30) Foreign Application Priority Data
May 7, 2020    (IN) .............................. 201941018541

(51) Int. Cl.
*H04W 68/02*    (2009.01)
*H04W 8/18*    (2009.01)
(Continued)

(52) U.S. Cl.
CPC ........... *H04W 8/183* (2013.01); *H04W 24/08* (2013.01); *H04W 68/005* (2013.01);
(Continued)

(58) Field of Classification Search
CPC . H04W 8/183; H04W 68/005; H04W 72/005; H04W 24/08; H04W 88/06;
(Continued)

(56) References Cited

U.S. PATENT DOCUMENTS 8,880,106 B2    11/2014 Dhanda et al.
9,232,555 B2*    1/2016 Su ........................ H04W 8/183
(Continued)

FOREIGN PATENT DOCUMENTS

EP    2605559    6/2013

*Primary Examiner* — Said M Elnoubi
(74) *Attorney, Agent, or Firm* — F. Chau & Associates, LLC

(57) ABSTRACT

The present disclosure relates to a user equipment and a method for operating multi-universal subscriber identity module in a wireless communication system. The method includes receiving parameters of a first paging cycle configuration in a first broadcast information from a first network entity and receiving parameters of a second paging cycle configuration in a second broadcast information from a second network entity. Subsequently, the method includes detecting one of a collision of a paging occasion of the first paging cycle configuration and a paging occasion of the second paging cycle configuration, a collision of a paging occasion of first paging cycle configuration and time-critical information broadcast from the second network entity and a collision of a paging occasion of second paging cycle configuration and time-critical information broadcast from the first network entity.

17 Claims, 14 Drawing Sheets

(51) Int. Cl.
  *H04W 68/00*  (2009.01)
  *H04W 72/00*  (2009.01)
  *H04W 24/08*  (2009.01)
  *H04W 88/06*  (2009.01)
  *H04W 72/04*  (2009.01)
  *H04W 84/04*  (2009.01)

(52) U.S. Cl.
  CPC ..... *H04W 72/005* (2013.01); *H04W 72/0446* (2013.01); *H04W 88/06* (2013.01); *H04W 84/042* (2013.01)

(58) Field of Classification Search
  CPC ........... H04W 72/0446; H04W 84/042; H04W 76/15; H04W 68/02; H04W 48/12; H04W 28/0294; H04W 74/0858; H04W 76/28; H04W 4/06
  See application file for complete search history.

(56) References Cited

U.S. PATENT DOCUMENTS

| | | | |
|---|---|---|---|
| 2009/0215473 A1* | 8/2009 | Hsu | G06K 19/0701 455/458 |
| 2016/0373215 A1* | 12/2016 | Nan | H04W 72/042 |
| 2018/0338281 A1* | 11/2018 | Bangolae | H04W 52/0216 |
| 2021/0044394 A1* | 2/2021 | Beale | H04L 5/0041 |

* cited by examiner

MULTI-UNIVERSAL SUBSCRIBER IDENTITY MODULE USER EQUIPMENT AND OPERATING METHOD THEREOF

CROSS REFERENCE TO RELATED APPLICATION

This application claims priority to, and the benefit of, Indian Provisional Application No. 201941018541 filed on May 9, 2019 and Indian Patent Application No. 201941018541 filed on May 7, 2020. The entire contents of the foregoing applications are hereby incorporated by reference for all purposes.

TECHNICAL FIELD

The present disclosure generally relates to wireless communications. Embodiments of the disclosure relate to a $3^{rd}$ Generation Partnership Project (3GPP) technology. Particularly, but not exclusively, certain embodiments relates to a Multi-Universal Subscriber Identity Module (MUSIM) User Equipment (UE) and method for operating the MUSIM UE in a wireless communication system.

BACKGROUND

Telecommunication is a method of transferring information between users using wire, radio, optical, or various other electromagnetic systems. Some modern communication systems use radio access technology (RAT) to transfer information. One example of a RAT includes the fifth generation (5G) network of 3GPP.

Communication networks may be configured to move and process a large amount of information. As technology advances, the amount of information transferred to and from users becomes larger and more frequent. As the information transferred becomes more frequent in the 5G network space, collisions present problems for network reliability.

A collision refers to when two or more network handling incidents occur simultaneously on a user equipment (UE). In some cases, the UE cannot handle multiple incidents. Paging and time-critical occasions are examples of procedures that may cause collisions and the information provided by these procedures may be interrupted or degraded when the collisions occur. Therefore, there is a need in the art for a system to reduce interrupted or degraded communications The information disclosed in this background of the disclosure section is for enhancement of understanding of the general background of the present disclosure and should not be taken as an acknowledgement or any form of suggestion that this information forms the prior art already known to a person skilled in the art.

SUMMARY

In an embodiment, the present disclosure may relate to a method for a Multi-Universal Subscriber Identity Module (MUSIM) User Equipment (UE) operating in a wireless communication system, the method comprising: receiving, by the UE, parameters of a first paging cycle configuration in a first broadcast information from a first network entity and a second paging cycle configuration in a second broadcast information from a second network entity; and detecting, by the UE, one of, a collision of a paging occasion of the first paging cycle configuration and a paging occasion of the second paging cycle configuration; a collision of the paging occasion of first paging cycle configuration and a time-critical information broadcast from the second network entity, and a collision of a paging occasion of second paging cycle configuration and a time-critical information broadcast from the first network entity.

In an embodiment, the present disclosure may relate to a User Equipment (UE) with a Multi-Universal Subscriber Identity Module (MUSIM) operating in a wireless communication system, the UE comprising: a processor; and a memory communicatively coupled to the processor, wherein the memory stores processor-executable instructions, which on execution, cause the processor to: receive parameters of a first paging cycle configuration in a first broadcast information from a first network entity and a second paging cycle configuration in a second broadcast information from a second network entity; and detect one of: a collision of a paging occasion of the first paging cycle configuration and a paging occasion of the second paging cycle configuration; a collision of the paging occasion of first paging cycle configuration and a time-critical information broadcast from the second network entity and a collision of the paging occasion of second paging cycle configuration and a time-critical information broadcast from the first network entity.

In an embodiment, a method of wireless communication at a User Equipment (UE) may include: receiving first parameters of a first paging cycle configuration in a first broadcast information from a first network entity; receiving second parameters of a second paging cycle configuration in a second broadcast information from a second network entity, wherein the second parameters are received based in part on a Multi-Universal Subscriber Identity Module (MUSIM) of the UE; and detecting a paging collision based on the first parameters and the second parameters.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described below, by way of example only, and with reference to the accompanying figures.

Figure 1:
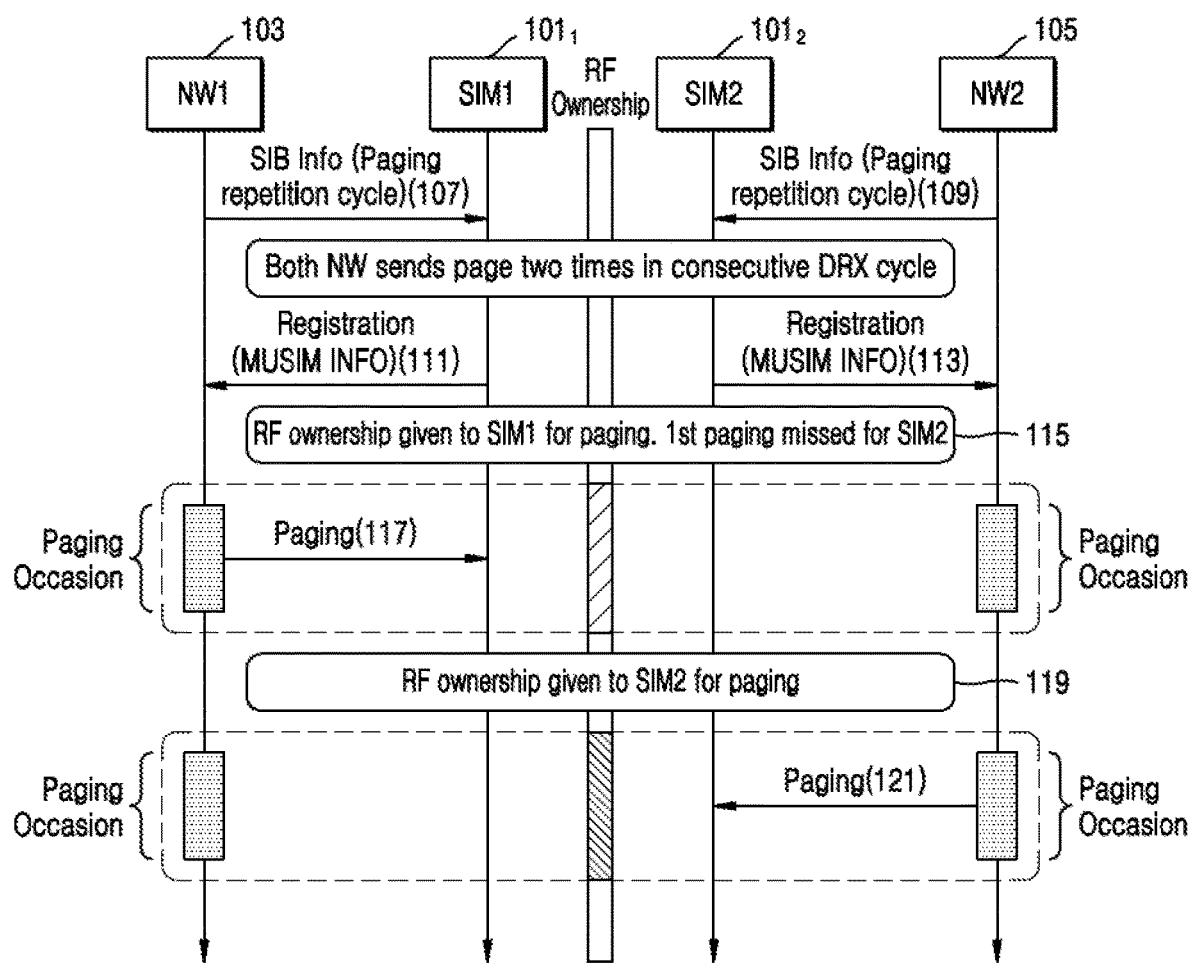
FIGS. 1 to 3 show exemplary sequence diagrams illustrating various methods for handling collisions between paging occasions on different USIMs and for handling collisions between paging occasion on one USIM and time-critical information on other USIMs in accordance with some embodiments of the present disclosure.

It should be appreciated by those skilled in the art that any block diagrams herein represent conceptual views of illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however that the specific embodiments are not intended to limit the disclosure to examples that are disclosed. On the contrary, the disclosure is to cover modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include those components or steps only, but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and the drawings are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

A Multi-Universal Subscriber Identity Module (MUSIM) user equipment (UE) may monitor paging and other time-critical occasions such as System Information Blocks (SIBs), Cell Broadcast Systems (CBS), Multimedia Broadcast Multicast Services (MBMS) and the like, on a network associated with a Universal Subscriber Identity Module (USIM). In general, the network used with each USIM may independently determine different occasions. The paging occasion of one USIM may collide with the paging and/or other time-critical occasions of other USIMs. These collisions are handled according to the UE implementations as there a standard mechanism is not devised for a MUSIM UE from the 3GPP standardization perspective. Therefore, information may not be present in communications of the paging or the time-critical occasions while handling a collision.

Figure 2:
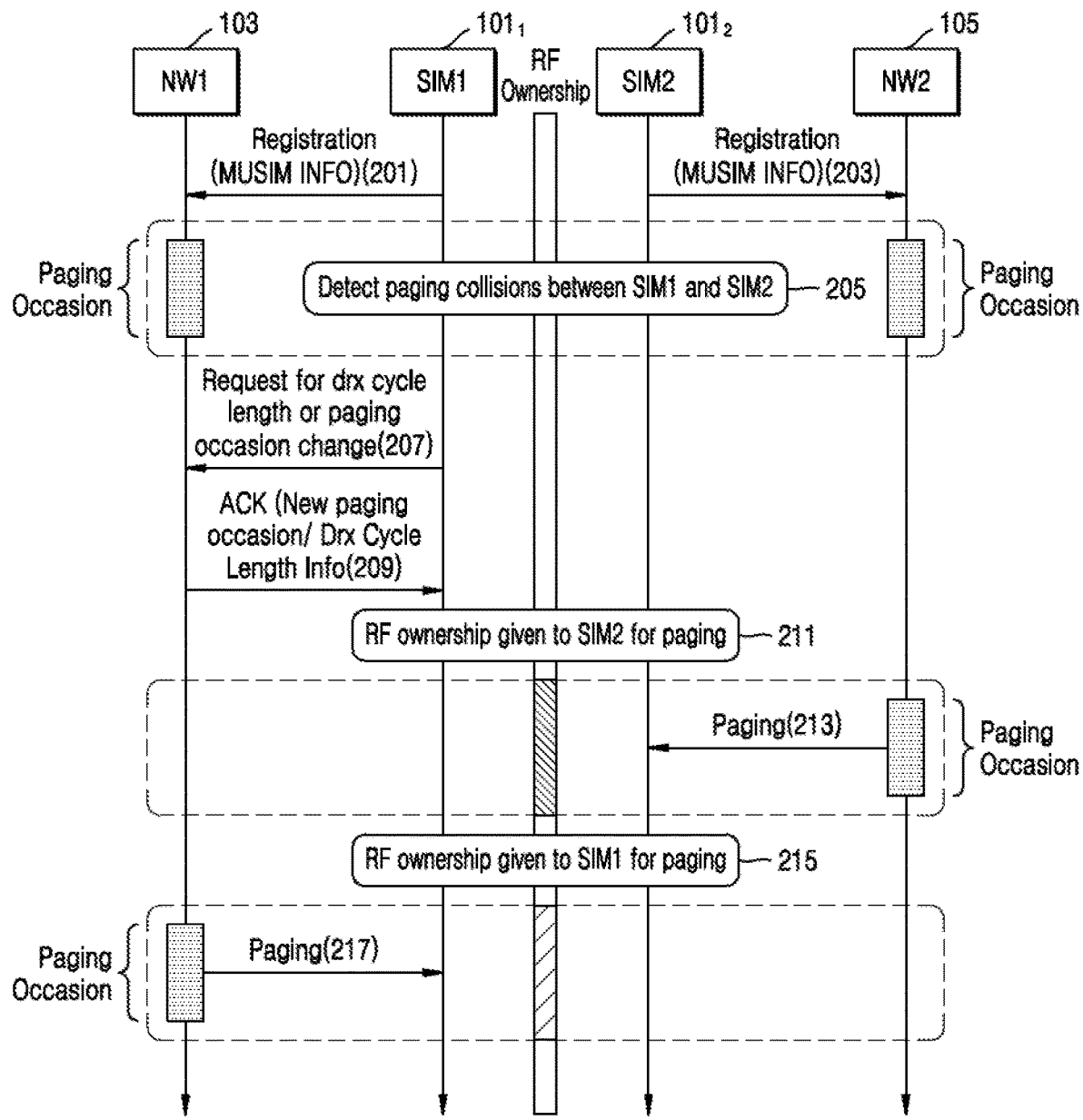
Figure 3:
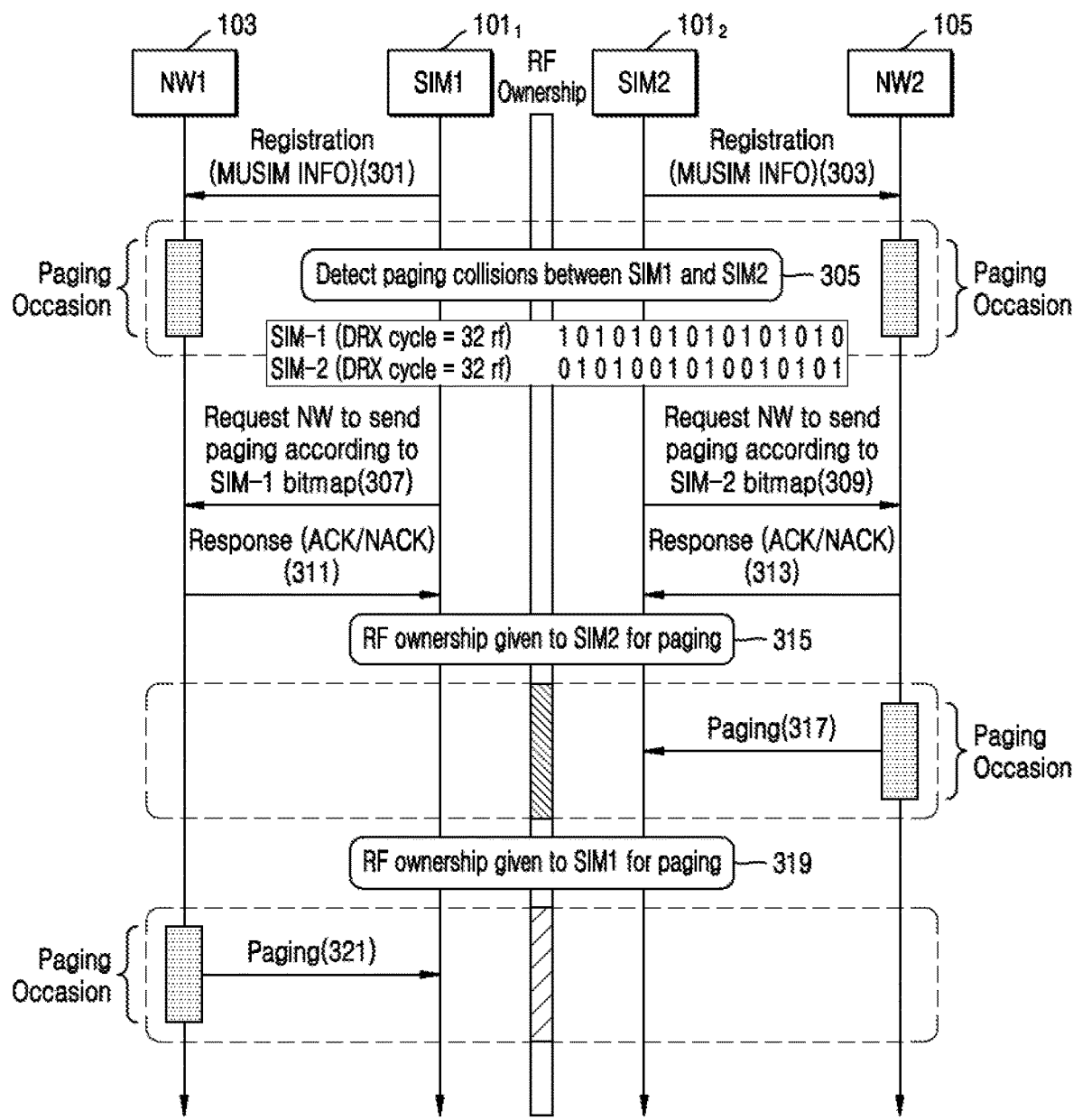

FIGS. 1 through 3 show exemplary sequence diagrams illustrating various methods for handling collisions between paging occasions on different Universal Subscriber Identity Modules (USIMs) and for handling collisions between paging occasions on one USIM and time-critical information on other USIMs in accordance with some embodiments of the present disclosure. FIGS. 1 to 3 provide alternate solutions to overcome collisions paging collisions on different USIMs and collisions between paging occasion on one USIM and time-critical occasion on different USIMs for Multi-Universal Subscriber Identity Module (MUSIM) devices.

With reference to the FIGS. 1, 2, and 3; the UE may comprise a MUSIM operating in a wireless communication system. In an embodiment, the UE may handle two USIMs i.e., SIM1 $101_1$ and SIM2 $101_2$ as shown in FIGS. 1, 2, and 3. In another embodiment, the UE may handle more than two USIMs. In FIG. 1, SIM1 $101_1$ may be associated to a first Network entity (NW1) 103 and SIM2 $101_2$ may be associated to a second Network entity (NW2) 105. The NW1 103 and the NW2 105 may belong to a different network service provider or to a same network service provider.

At step 107, SIM1 $101_1$ may receive parameters of a first paging cycle configuration in a first broadcast information from the NW1 103. The parameters of the first paging cycle configuration may comprise at least a paging periodicity. The paging periodicity is a number of paging message repetitions during a time period over several paging cycles of the first paging cycle configuration. At step 109, SIM2 $101_2$ may receive parameters of a second paging cycle configuration in a second broadcast information from the NW2 105. The parameters of the second paging cycle configuration may comprise at least a paging periodicity, wherein the paging periodicity is the number of paging message repetitions during a time period over several paging cycles of the second paging cycle configuration. At step 111, the UE may register of SIM1 $101_1$ with NW1 103. Similarly, at step 113, the UE may register of SIM2 $101_2$ with NW2 105. At step 115, the UE may detect collision of a paging occasion of the first paging cycle configuration and a paging occasion of the second paging cycle configuration. In an embodiment, the UE may detect collision of a paging occasion of first paging cycle configuration and time-critical information broadcast from the NW2 105. In another embodiment, the UE may detect collision of a paging occasion of second paging cycle configuration and time-critical information broadcast from the NW1 103.

The time-critical information broadcast may comprise of occasions related to a System Information Block (SIBs) scheduling window, a Cell Broadcast Service (CBS) transmission window, a Multimedia Broadcast Multicast Service (MBMS) transmission time slots and Observed Time Difference of Arrival (OTDOA) measurements. The UE may detect collision based on the parameters of a first paging cycle configuration and the parameters of a second paging cycle configuration. The UE may determine time slot within a radio frame calculated according to the first paging cycle configuration and the UE identifier allocated by the NW1 103 matching the time slot within a radio frame calculated according to the second paging cycle configuration and the UE identifier allocated by the NW2 105.

In an example embodiment, when the UE detects a collision of a paging occasion of first paging cycle configuration and time-critical information broadcast from the NW2 105, the UE may determine the time slot within a radio frame calculated according to the first paging cycle configuration and the UE identifier allocated by the NW1 103 matching at least one-time slot within a time window where time-critical information associated the NW2 105 is broadcasted. The time-critical information associated the NW2 105 may prioritize reception of paging message in the time slot corresponding to the paging occasion of first paging cycle configuration. In another example embodiment, when the UE detects a collision of a paging occasion of second paging cycle configuration and time-critical information broadcast from the NW1 103, the UE may determine the time slot within a radio frame calculated according to the second paging cycle configuration and the UE identifier allocated by the NW2 105 matching at least one-time slot within a time window where time-critical information associated the NW1 103 is broadcasted. The where time-critical information associated the NW1 103 may prioritize the reception of paging message in the time slot corresponding to the paging occasion of second paging cycle configuration. At step 117, the UE may tune at a first colliding time slot a radio frequency circuitry to monitor paging occasion or time-critical occasions of the first paging cycle configuration from the NW1 103 on SIM1 $101_1$ and the UE may ignore the paging occasion of the second paging cycle configuration from the NW2 105 on SIM2 $101_2$. At steps 119 and 121, the UE may re-tune at a second colliding time slot a radio frequency circuitry to monitor paging occasion or time-critical occasions of the second paging cycle configuration from the NW2 105 on SIM2 $101_2$ and the UE may ignore the paging occasion of the first paging cycle configuration from the NW1 103 on SIM1 $101_1$. The UE may choose the paging occasion or time-critical occasions to be monitored on each USIM such that the UE does not miss the paging or the time-critical occasions for any incoming service.

With reference to the FIG. 2, SIM1 $101_1$ may receive parameters of a first paging cycle configuration in a first broadcast information from the NW1 103 (not shown in FIG. 2). The parameters of the first paging cycle configuration may comprise at least a paging periodicity, wherein the paging periodicity is the number of paging message repetitions during a time period over several paging cycles of the first paging cycle configuration. Similarly, SIM2 $101_2$ may receive parameters of a second paging cycle configuration in a second broadcast information from the NW2 105 (not shown in FIG. 2). The parameters of the second paging cycle configuration may comprise at least a paging periodicity, wherein the paging periodicity is the number of paging message repetitions during a time period over several paging cycles of the second paging cycle configuration.

At step 201, the UE may register of SIM1 $101_1$ with NW1 103. Similarly, at step 203, the UE may register of SIM2 $101_2$ with NW2 105. At 205, the UE may detect collision of a paging occasion of the first paging cycle configuration and a paging occasion of the second paging cycle configuration. In an embodiment, the UE may detect collision of a paging occasion of first paging cycle configuration and time-critical information broadcast from the NW2 105. In another embodiment, the UE may detect collision of a paging occasion of second paging cycle configuration and time-critical information broadcast from the NW1 103. The time-critical information broadcast may comprise of occasions related to SIBs scheduling window, CBS transmission window, MBMS transmission time slots and OTDOA measurements. The UE may detect collision based on the parameters of a first paging cycle configuration and the parameters of a second paging cycle configuration. The UE may determine time slot within a radio frame calculated according to the first paging cycle configuration and a UE identifier allocated by the NW1 103 matching the time slot within a radio frame calculated according to the second paging cycle configuration and the UE identifier allocated by the NW2 105. In an embodiment, when the UE detects a collision of a paging occasion of a first paging cycle configuration and time-critical information broadcast from the NW2 105, the UE may determine the time slot within a radio frame calculated according to the first paging cycle configuration and the UE identifier allocated by the NW1 103 matching at least one-time slot within a time window where time-critical information associated the NW2 105 is broadcasted and may prioritize reception of paging message in the time slot corresponding to the paging occasion of first paging cycle configuration. In another embodiment, when the UE detects a collision of a paging occasion of second paging cycle configuration and time-critical information broadcast from the NW1 103, the UE may determine the time slot within a radio frame calculated according to the second paging cycle configuration and the UE identifier allocated by the NW2 105 matching at least one-time slot within a time window where time-critical information associated the NW1 103 is broadcasted and may prioritize the reception of paging message in the time slot corresponding to the paging occasion of second paging cycle configuration.

At step 207, the UE may send a request from SIM1 $101_1$ to change paging cycle configuration (or Discontinuous Reception (DRX) cycle length) to the NW1 103 if information about paging periodicity and the number of paging message repetitions during a time period over several paging cycles is missing in one of the first paging cycle configuration and the second paging cycle configuration. In an embodiment, the UE may send a request from SIM1 $101_2$ to change paging cycle configuration (or DRX cycle length) to the NW2 105 if information about paging periodicity and the number of paging message repetitions during a time period over several paging cycles is missing in one of the first paging cycle configuration and the second paging cycle configuration.

At step 209, the UE may receive Acknowledgement (ACK) or Negative ACK (NACK) from the NW1 103 in response to a request sent by the UE to the NW1 103 to change the paging cycle configuration. Subsequently, after receiving an ACK signal, the UE may receive a third paging cycle configuration from the NW1 103 at SIM1 $101_1$. In an embodiment, the UE may receive ACK or NACK from the NW2 105 when the UE sends a request to change the paging cycle configuration (or DRX cycle length) to the NW2 105. Subsequently, after receiving the ACK signal, the UE may receive a third paging cycle configuration from the NW2 105 at SIM1 $101_2$. The third paging cycle configuration may comprise at least a new paging periodicity, a time offset for determining the time slot associated with paging occasion and a number of paging message repetitions during a time period over several paging cycles of the third paging cycle configuration. At steps 211 and 213, the UE may monitor paging occasion based on the second paging cycle configuration or the time-critical occasion based on broadcast information from the NW2 105 on SIM2 $101_2$.

At steps 215 and 217, the UE may monitor paging occasion based on the third paging cycle configuration or the time-critical occasion based on broadcast information from the NW1 103 on SIM1 $101_1$. The UE may request a change of DRX cycle length or paging occasions to the NW1 103 or the NW2 105. The NW1 103 or the NW2 105 honours the request made by the UE. As a result, the UE may not miss the paging or the time-critical occasions for any incoming service.

Thus, according to certain embodiments, a method of wireless communication at a User Equipment (UE) may include receiving first parameters of a first paging cycle configuration in a first broadcast information from a first network entity, receiving second parameters of a second paging cycle configuration in a second broadcast information from a second network entity, wherein the second parameters are received based in part on a MUSIM of the UE, and detecting a paging collision based on the first parameters and the second parameters.

In some examples, the paging collision comprises a collision of the first paging cycle configuration and a paging occasion of the second paging cycle configuration or a collision of the paging occasion of first paging cycle configuration and a time-critical information broadcast from the second network entity.

In some examples, the method further includes tuning a radio frequency circuitry during a first colliding time slot to monitor a paging occasion of the first paging cycle configuration, and re-tuning the radio frequency circuitry at a second colliding time slot to monitor a paging occasion of the second paging cycle configuration.

Thus, in some cases, by detecting the paging collision between networks providing service for a first SIM and a second SIM of a MUSIM of the UE, the UE may resolve the conflict by tuning a radio to different frequencies at different times in order to receive paging information or other information broadcasts. This may enable the UE to more effectively communication using multiple SIMS.

With reference to FIG. 3, SIM1 $101_1$ may receive parameters of a first paging cycle configuration in a first broadcast information from the NW1 (not shown in FIG. 3). The parameters of the first paging cycle configuration may comprise at least a paging periodicity, wherein the paging periodicity is the number of paging message repetitions during a time period over several paging cycles of the first paging cycle configuration. SIM2 $101_2$ may receive parameters of a second paging cycle configuration in a second broadcast information from the NW2 (not shown in FIG. 3). The parameters of the second paging cycle configuration may comprise at least a paging periodicity, wherein the paging periodicity is the number of paging message repetitions during a time period over several paging cycles of the second paging cycle configuration.

At step 301, the UE may register SIM1 $101_1$ with NW1 103. Similarly, at step 303, the UE may register SIM2 $101_2$ with NW2 105. At step 305, the UE may detect collision of a paging occasion of the first paging cycle configuration and a paging occasion of the second paging cycle configuration. In an embodiment, the UE may detect collision of a paging occasion of first paging cycle configuration and time-critical information broadcast from the NW2 105. In another embodiment, the UE may detect collision of a paging occasion of second paging cycle configuration and time-critical information broadcast from the NW1 103. The time-critical information broadcast may comprise of occasions related to SIBs scheduling window, CBS transmission window, MBMS transmission time slots and OTDOA measurements. The UE may detect collision based on the parameters of a first paging cycle configuration and the parameters of a second paging cycle configuration. The UE may determine the time slot within a radio frame calculated according to the first paging cycle configuration and the UE identifier allocated by the NW1 103 matching the time slot within a radio frame calculated according to the second paging cycle configuration and the UE identifier allocated by the NW2 105. In an embodiment, when the UE detects a collision of a paging occasion of first paging cycle configuration and time-critical information broadcast from the NW2 105, the UE may determine the time slot within a radio frame calculated according to the first paging cycle configuration and the UE identifier allocated by the NW1 103 matching at least one-time slot within a time window where time-critical information associated the NW2 105 is broadcasted and may prioritize reception of paging message in the time slot corresponding to the paging occasion of first paging cycle configuration. In another embodiment, when the UE detects a collision of a paging occasion of second paging cycle configuration and time-critical information broadcast from the NW1 103, the UE may determine the time slot within a radio frame calculated according to the second paging cycle configuration and the UE identifier allocated by the NW2 105 matching at least one-time slot within a time window where time-critical information associated the NW1 103 is broadcasted and may prioritize the reception of paging message in the time slot corresponding to the paging occasion of second paging cycle configuration.

At steps 307 and 309, the UE may send to at least one of the NW1 103 and the NW2 105 assistance information comprising a bitmap corresponding to time slots indicating the availability of the UE radio frequency circuitry for paging monitoring during respective paging occasions or time-critical occasions from SIM1 $101_1$ and SIM2 $101_2$, respectively. One such example of bitmap positions that the UE may share with the NW1 103 and NW2 105 is shown below in table 1. The value 1 may indicate a certain USIM is available for paging at that occasion. Each value may be separated by a DRX cycle length.

TABLE 1

| | |
|---|---|
| SIM-1 (DRX cycle = 32 rf) | 1 0 1 0 1 0 1 0 1 0 1 0 1 0 1 0 |
| SIM-2 (DRX cycle = 32 rf) | 0 1 0 1 0 1 0 0 1 0 0 1 0 1 0 1 |
| SIM-1 (DRX cycle = 128 rf) | 1 0 0 0 1 0 0 0 1 0 0 0 1 0 0 0 |
| SIM-2 (DRX cycle = 32 rf) | 0 1 1 1 0 1 1 1 0 1 1 1 0 1 1 1 |

At steps 311, the UE may receive one of an Acknowledgement (ACK) or a Negative ACK (NACK) response from the NW1 103 at SIM1 $101_1$ in response to sending the assistance information comprising bitmap positions for paging reception. Similarly, at steps 313, the UE may receive one of an Acknowledgement (ACK) or a Negative ACK (NACK) response from the NW2 105 at SIM2 $101_2$ in response to sending the assistance information comprising bitmap positions for paging reception. At steps 315 and 317, the UE may monitor paging occasion or time-critical occasion from the NW2 105 on SIM2 $101_2$ based on bitmap positions for paging reception and ACK response from the NW2 105. At steps 319 and 321, the UE may monitor paging occasion or time-critical occasion from the NW1 103 on SIM1 $101_1$ based on bitmap positions for paging reception and ACK response from the NW1 103. As a result, the UE may share assistance information comprising a bitmap corresponding to time slots indicating the availability of the UE radio frequency circuitry for paging monitoring to at least one of the NW1 103 and the NW2 105 so that the UE does not miss the paging or the time-critical occasions for any incoming service.

Figure 4:
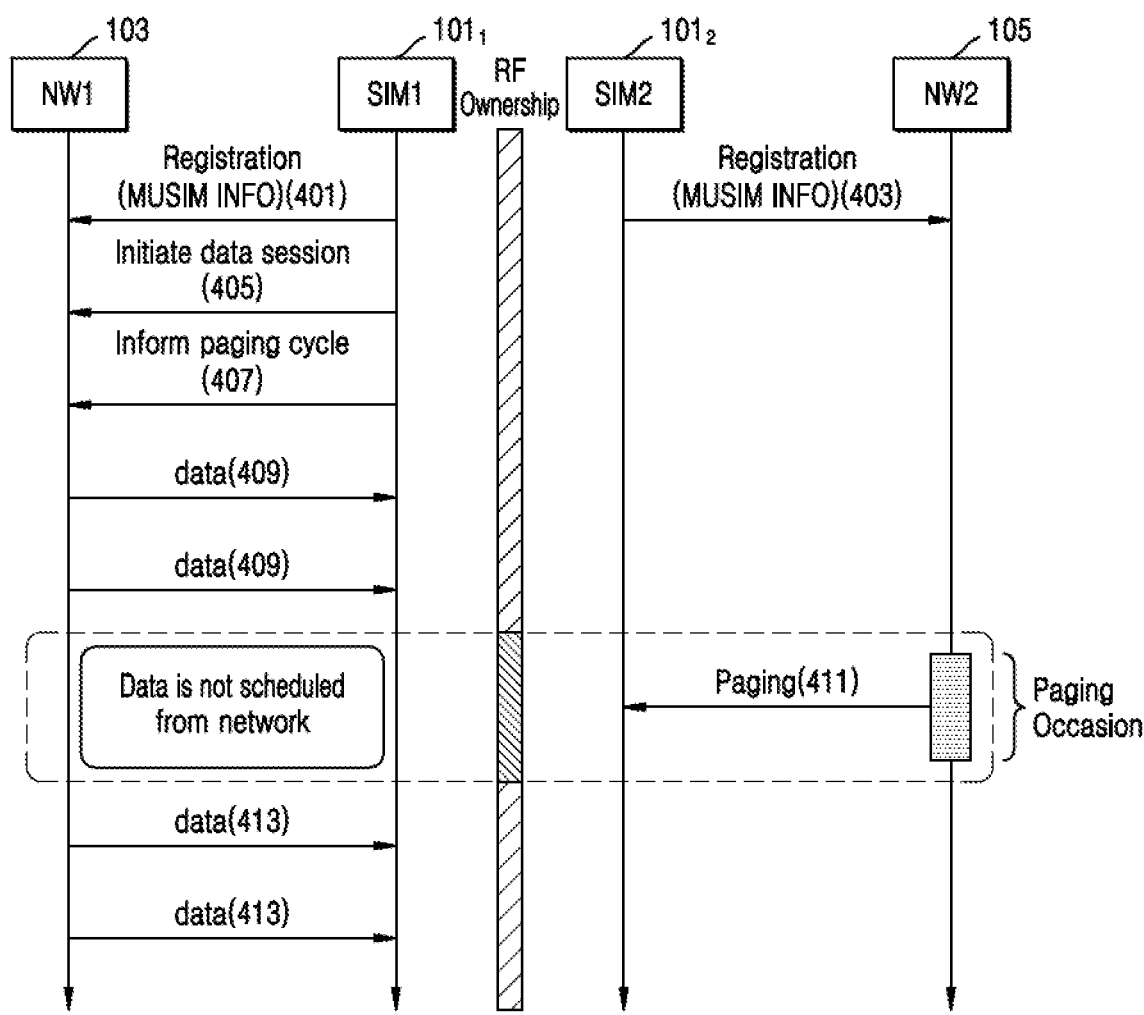
FIGS. 4 to 6 show exemplary sequence diagrams illustrating various methods of handling a data session in one USIM and monitoring paging occasions or time-critical occasions on other USIMs in accordance with some embodiments of the present disclosure.
Figure 5:
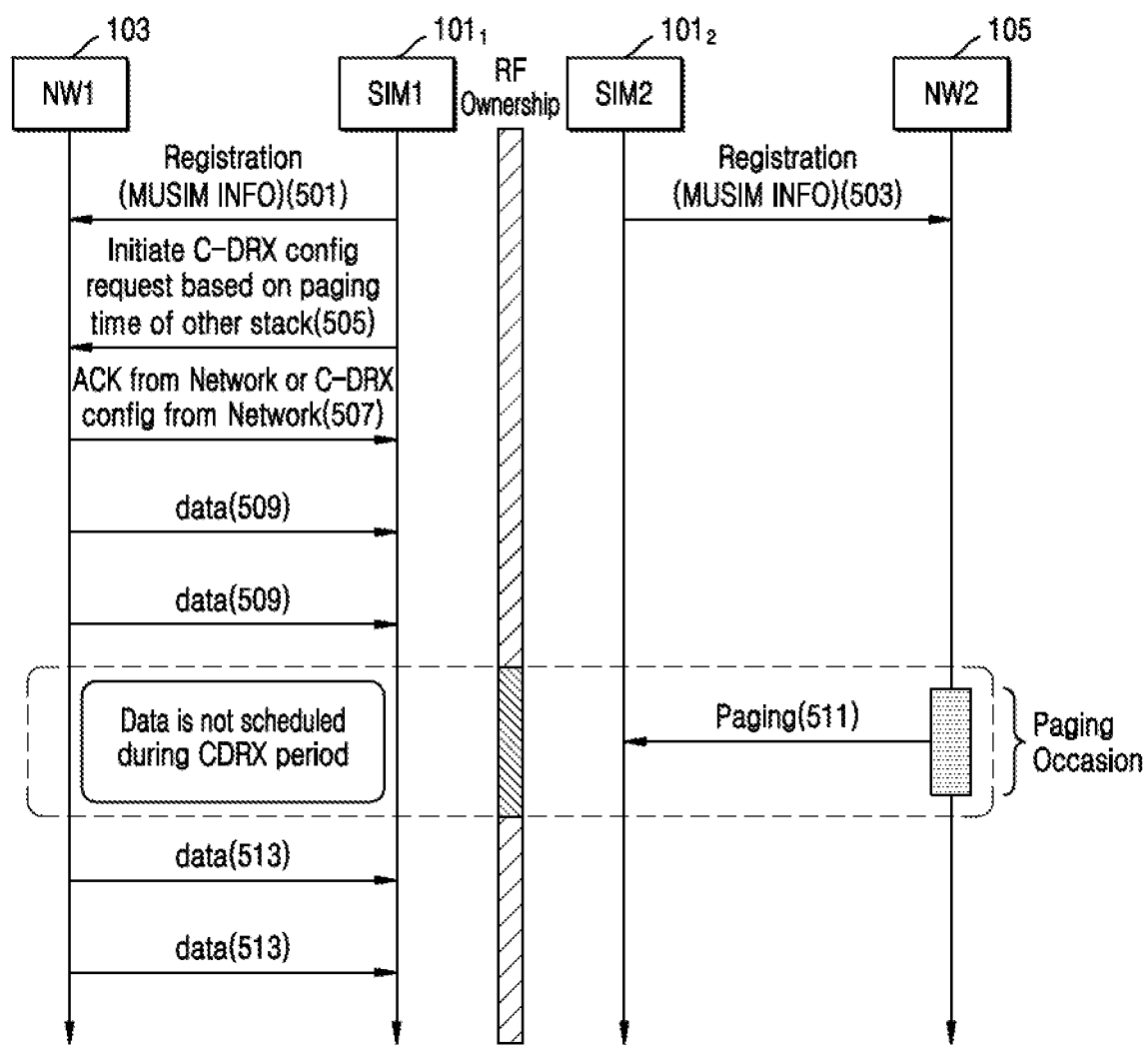
Figure 6:
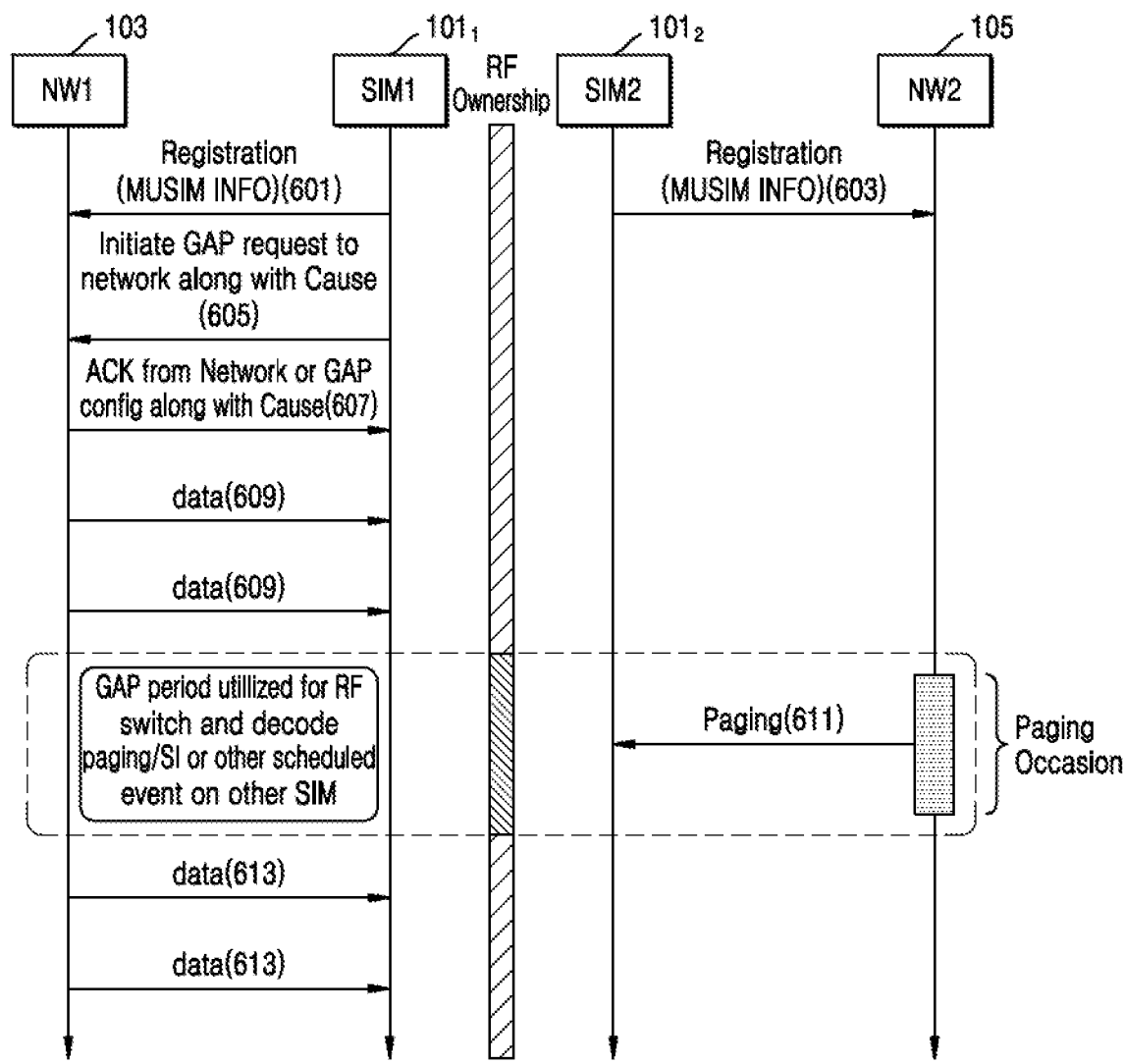

FIGS. 4 to 6 show exemplary sequence diagrams illustrating various methods for handling a data session in one USIM and monitoring paging or time-critical occasions on other USIMs in accordance with some embodiments of the present disclosure.

In a case of a MUSIM, a user may start and continue the data session on one USIM while he/she expects to receive any incoming service on other USIMs. To receive any incoming service on other USIMs, the UE may temporarily leave the existing network, which is associated with the data session and monitor the paging occasions, and other time-critical occasions on other USIMs (Radio Frequency (RF) blackout time on the data session USIM). Presently, this situation is handled as the UE specific implementation. However, since the network involved in the data session is not aware of the UE temporarily moving to other networks (i.e., radio frequency circuitry monitors paging or time-critical occasions on other USIMs), the network continues to allocate resources for the data session may not be used by the UE. Once the UE moves back to the network associated with the data session by tuning back the radio frequency circuitry, the UE may recover through retransmissions. To maintain the fairness of allocation, this may lead some penalty to the UE from the associated network for not using the allocated resources, causing Key Performance Indicators (KPI) degradation in subsequent resource allocation from an associated network. FIGS. 4 to 6 provide alternate solutions to deal with the handling of simultaneous data sessions in one USIM and monitoring of paging or time-critical occasions on other USIMs for MUSIM devices.

With reference to FIGS. 4, 5, and 6, the UE may comprise a MUSIM operating in a wireless communication system. In an embodiment, the UE may handle two USIM, i.e., SIM1 $101_1$ and SIM2 $101_2$, as shown in FIGS. 4, 5, and 6. In another embodiment, the UE may handle more than two USIMs. In FIG. 1, SIM1 $101_1$ may be associated with NW1 103 and SIM2 $101_2$ may be associated with NW2 105. The NW1 103 and the NW2 105 may belong to a different network service provider or to a same network service provider.

In FIG. 4, the SIM1 $101_1$ may receive parameters of a first paging cycle configuration in a first broadcast information from the NW1 103 and the SIM2 $101_2$ may receive parameters of a second paging cycle configuration in a second broadcast information from the NW2 105 (not shown in FIG. 4). The parameters of the first paging cycle configuration may comprise at least a paging periodicity, wherein the paging periodicity is the number of paging message repetitions during a time period over several paging cycles of the first paging cycle configuration. The parameters of the second paging cycle configuration may comprise at least a paging periodicity, wherein the paging periodicity is the number of paging message repetitions during a time period over several paging cycles of the second paging cycle configuration.

At step 401, the UE may register of SIM1 $101_1$ with NW1 103. Similarly, at step 403, the UE may register of SIM2 $101_2$ with NW2 105. At step 405, the UE may initiate a data session with NW1 103 from SIM1 $101_1$. At step 407, the UE may inform NW1 103 about the paging cycle configuration with the information about time instance of paging monitoring occasion and periodicity for successive monitoring occasions of SIM2 $101_2$ calculated by using DRX cycle length parameter received as part of broadcast information from NW2 105. Additionally or alternatively, the network may inform NW1 103 about time instance of time-critical occasions and its periodicity of SIM2 $101_2$ calculated based on broadcast information received from NW2 105 (not shown in FIG. 4).

Subsequently, at step 409, the SIM1 $101_1$ and the NW1 103 may communicate data. At step 411, data may not be scheduled from NW1 103 based on the paging cycle configuration informed by the UE at step 407. The NW1 103 associated with the data session may stop scheduling the resources during the RF blackout periods when the radio frequency circuitry of the UE is tuned to SIM2 $101_2$ for monitoring paging occasion from NW2 105. The NW1 103 associated with the data session may temporarily suspend the ongoing connection during RF blackout periods when the radio frequency circuitry of the UE is tuned to SIM2 $101_2$ for monitoring a paging occasion from NW2 105. The time-critical occasions may comprise of occasions related to SIBs scheduling window, CBS transmission window, MBMS transmission time slots and OTDOA measurements. Once the paging occasion or time-critical occasions from the NW2 105 on SIM2 $101_2$ is over, at step 413, the UE may resume the data session with NW1 103 on SIM1 $101_1$ and NW1 103 may start allocating the resources after resuming. As a result, waste of network resources in NW1 103, without the UE not missing any paging or time-critical occasion on SIM2 $101_2$ associated with NW2 105, may be reduced.

In FIG. 5, the SIM1 $101_1$ may receive parameters of a first paging cycle configuration in a first broadcast information from the NW1 103. The SIM2 $101_2$ may receive parameters of a second paging cycle configuration in a second broadcast information from the NW2 105 (not shown in FIG. 5). The parameters of the first paging cycle configuration may comprise at least a paging periodicity, wherein the paging periodicity is the number of paging message repetitions during a time period over several paging cycles of the first paging cycle configuration. The parameters of the second paging cycle configuration may comprise at least a paging periodicity, wherein the paging periodicity is the number of paging message repetitions during a time period over several paging cycles of the second paging cycle configuration.

At step 501, the UE may register of SIM1 $101_1$ with NW1 103. Similarly, at step 503, the UE may register of SIM2 $101_2$ with NW2 105. At step 505, the UE may request NW1 103 to configure Connected Mode Discontinuous Reception (C-DRX) in such a way that start C-DRX idle/sleep start and end time instance on SIM1 $101_1$ overlaps with the monitoring of paging or time-critical occasion on SIM2 $101_2$ from NW2 105. In request mode, the UE may inform the NW1 103 that the requested C-DRX is for a particular intention, such as paging or time-critical occasions. The information may help the NW1 with scheduling as the NW1 may attempt to ensure that the UE on SIM1 $101_1$ goes to DRX idle/sleep at the starting of monitoring paging or time-critical occasion on SIM2 $101_2$ from NW2 105 and goes to DRX wakeup after the end of monitoring paging or time-critical occasion on SIM2 $101_2$ from NW2 105.

Subsequently, at step 507, the SIM1 $101_1$ of the UE may receive at least one of an ACK response and a C-DRX configuration from the NW1 103. At step 509, the SIM1 $101_1$ and the NW1 103 may communicate data. At step 511, data may not be scheduled from NW1 103, causing the UE to go to C-DRX sleep on SIM1 $101_1$. At the same time, the UE may monitor paging or time-critical occasions from the NW2 105 on SIM2 101₂. The time-critical occasions may comprise of occasions related to SIBs scheduling window, CBS transmission window, MBMS transmission time slots and OTDOA measurements. Once the paging occasion or the time-critical occasions from the NW2 105 with SIM2 101₂ is over, at step 513, the UE may resume the data session with NW1 103 with SIM1 101₁ by ending the C-DRX sleep (i.e., doing C-DRX wakeup) as per the C-DRX configuration received from NW1 103. As a result, waste of network resources in NW1 103, without the UE missing monitoring of paging or time-critical occasion on SIM2 101₂ associated with NW2 105, may be reduced.

In FIG. 6, the SIM1 101₁ may receive parameters of a first paging cycle configuration in a first broadcast information from the NW1 103 and the SIM2 101₂ may receive parameters of a second paging cycle configuration in a second broadcast information from the NW2 105 (not shown in FIG. 6). The parameters of the first paging cycle configuration may comprise at least a paging periodicity, wherein the paging periodicity is the number of paging message repetitions during a time period over several paging cycles of the first paging cycle configuration. The parameters of the second paging cycle configuration may comprise at least a paging periodicity, wherein the paging periodicity is the number of paging message repetitions during a time period over several paging cycles of the second paging cycle configuration. At step 601, the UE may register of SIM1 101₁ with NW1 103. Similarly, at step 603, the UE may register of SIM2 101₂ with NW2 105. At step 605, the UE may request NW1 103 to configure gaps similar to measurement gaps in such a way that configured gap start and end time of SIM1 101₁ overlaps on the monitoring time of paging and the time-critical occasion on SIM2 101₂ associated with NW2 105. In request mode, the UE may inform the NW1 103 which requested gap configuration is for which intention, say paging or time-critical occasions. This information may help the NW1 for scheduling. Subsequently, at step 607, the SIM1 101₁ of the UE may receive at least one of an ACK response and a gap configuration indicating gap intention from the NW1 103 so that this gap can be effectively utilized for monitoring of paging or time-critical occasions of SIM2 101₂. At step 609, the SIM1 101₁ and the NW1 103 may communicate data. At step 611, data may not be scheduled from NW1 103 during the configured gap period (i.e., from the first time slot to the last time slot within the configured gap time). At the same time, the UE may monitor paging occasion or time-critical occasions from the NW2 105 on SIM2 101₂. The time-critical occasions may comprise of occasions related to SIBs scheduling window, CBS transmission window, MBMS transmission time slots and OTDOA measurements. Once the paging occasion or the time-critical occasions from the NW2 105 with SIM2 101₂ is over, at step 613, the UE may resume the data session with NW1 103 with SIM1 101₁ by ending the configured gap period. As a result, waste of network resources in NW1 103, without the UE missing monitoring of paging or time-critical occasion on SIM2 101₂ associated with NW2 105, may be reduced.

Figure 7A:
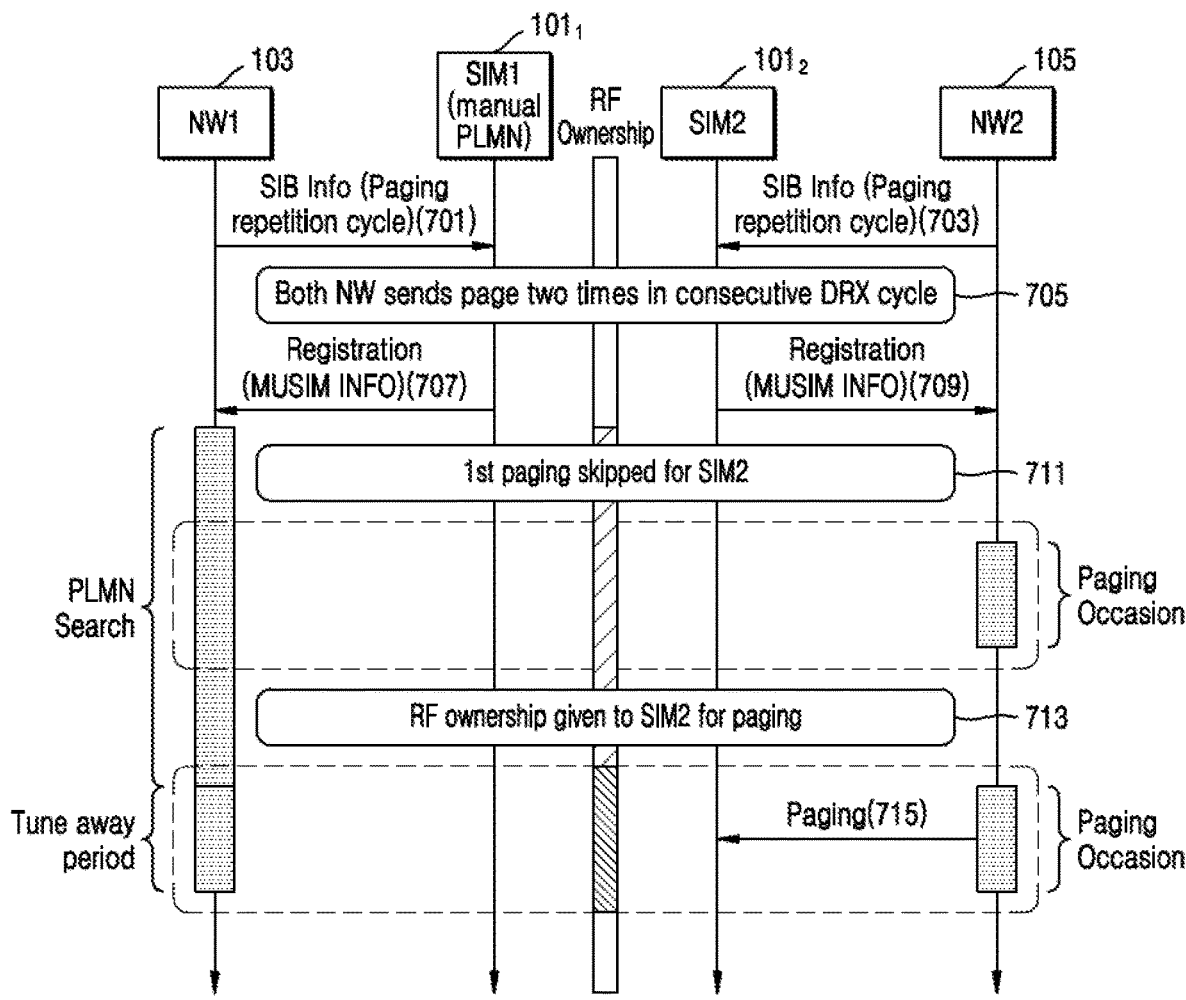
FIGS. 7A and 7B show exemplary sequence diagrams illustrating a method of improving time for one of manual Public Land Mobile Network (PLMN) search or inter-frequency or inter-RAT (Radio Access Technology) measurements in MUSIM device in accordance with some embodiments of the present disclosure.
Figure 7B:
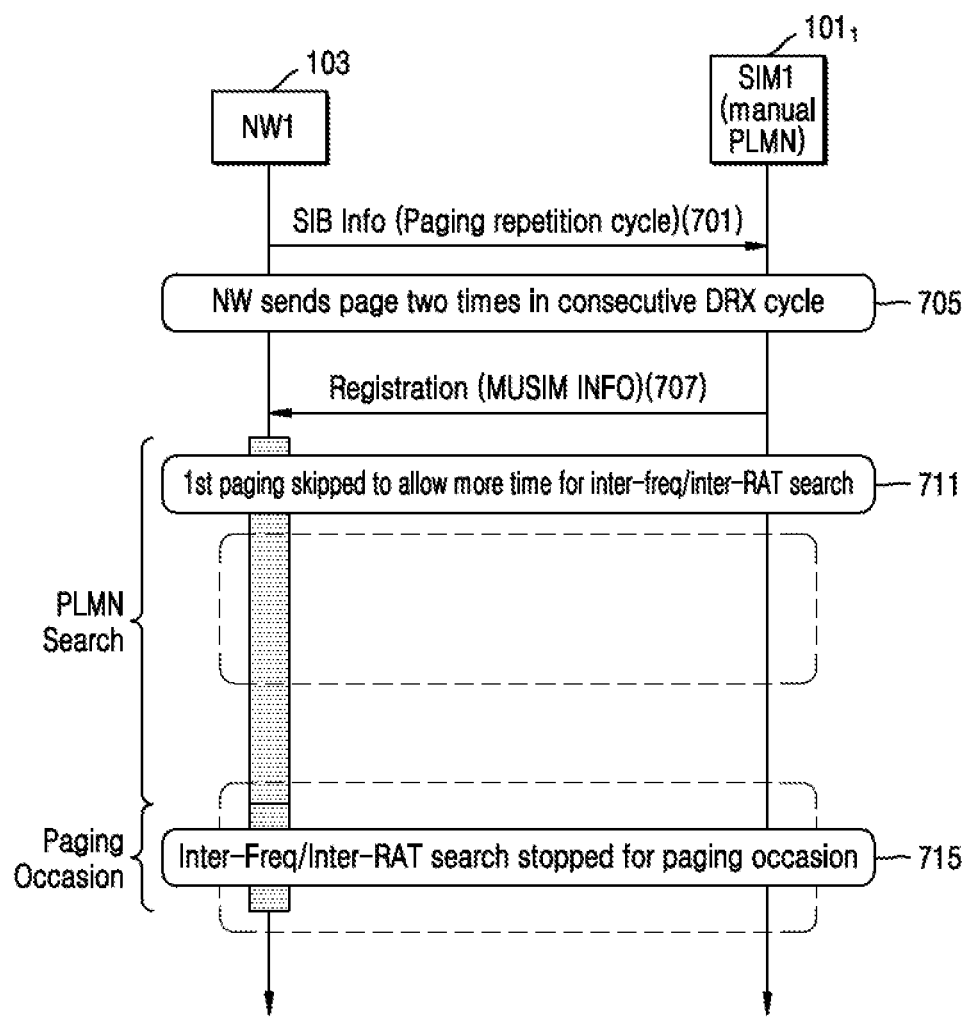

FIGS. 7A and 7B show exemplary sequence diagrams illustrating a method of improving time for one of manual Public Land Mobile Network (PLMN) search or inter-frequency or inter-RAT (Radio Access Technology) measurements in MUSIM device in accordance with some embodiments of the present disclosure.

Presently, longer PLMN search time in observed in MUSIM devices as compared to single USIM device. To receive any incoming service on other USIMs, the UE may temporarily suspend ongoing one of a manual PLMN search or an inter-frequency or inter-RAT measurements on one USIM to go and monitor paging and other time-critical occasions on other USIMs). Due to suspension of manual PLMN search or inter-frequency or inter-RAT measurements, the time taken to complete the operation of one of manual PLMN search or inter-frequency or inter-RAT measurements is longer compared to single USIM device. FIGS. 7A and 7B disclose optimizing one of manual PLMN search or inter-frequency or inter-RAT measurements in the MUSIM device.

With reference to the FIGS. 7A and 7B, the UE may comprise MUSIM operating in a wireless communication system. In an embodiment, the UE may handle two USIM, i.e., SIM1 101₁ and SIM2 101₂ as shown in FIG. 7A. In another embodiment, the UE may handle more than two USIM. In FIG. 7A, SIM1 101₁ may be associated with NW1 103 and SIM2 101₂ may be associated with NW2 105. The NW1 103 and the NW2 105 may belong to a different network service provider or to a same network service provider.

At step 701, SIM1 101₁ may receive parameters of a first paging cycle configuration in a first broadcast information from the NW1 103. The parameters of the first paging cycle configuration may comprise at least a paging periodicity, wherein the paging periodicity is the number of paging message repetitions during a time period over several paging cycles of the first paging cycle configuration. At step 703, SIM2 101₂ may receive parameters of a second paging cycle configuration in a second broadcast information from the NW2 105. The parameters of the second paging cycle configuration may comprise at least a paging periodicity, wherein the paging periodicity is the number of paging message repetitions during a time period over several paging cycles of the second paging cycle configuration. At step 707, the UE may register of SIM1 101₁ with NW1 103. Similarly, at step 709, the UE may register of SIM2 101₂ with NW2 105.

At step 711, the UE may select a non-paging cycle of SIM2 101₂ with NW2 105 based on the parameters of the second paging configuration to perform one of manual PLMN search or inter-frequency measurements or inter-RAT measurements on SIM1 101₁ when an occurrence of paging occasion or time-critical occasion is not detected on SIM2 101₂ associated with NW2 as shown in FIG. 7A. The UE may select a non-paging cycle of SIM1 101₁ based on the parameters of the first paging configuration to perform one of manual PLMN search or inter-frequency measurements or inter-RAT measurements on SIM1 101₁ when an occurrence of paging occasion or time-critical occasion is not detected as shown in FIG. 7B. The UE may select a non-paging cycle of SIM2 101₂ with NW2 105 based on the parameters of the second paging configuration to perform one of manual PLMN search or inter-frequency measurements or inter-RAT measurements on SIM2 101₂ when an occurrence of paging occasion or time-critical occasion is not detected on SIM2 101₂ (not shown in FIG. 7B).

At steps 713 and 715, the UE may stop the ongoing one of manual PLMN search or inter-frequency measurements or inter-RAT measurements in SIM1 101₁ and monitor paging occasions or time-critical occasions of the second paging cycle configuration from the NW2 105 on SIM2 101₂. The time-critical occasions may comprise of occasions related to SIBs scheduling window, CBS transmission window, MBMS transmission time slots and OTDOA measurements. As a result, based on the parameters of the paging cycle configuration received from the network, the UE may choose the paging or time-critical occasion to be monitored on each USIM such that the UE does not miss the paging for any incoming service. At the same time, the UE decreases the overall time taken for one of a manual PLMN search or inter-frequency measurements or inter-RAT measurements in other USIMs.

Figure 8:
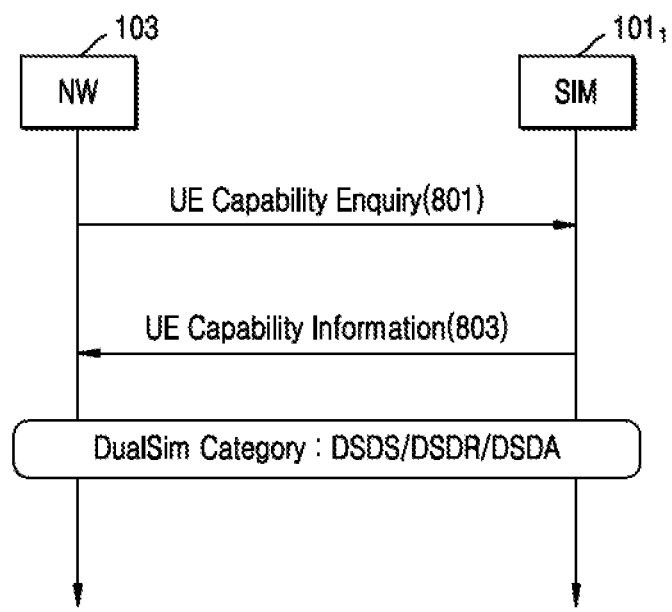
FIG. 8 shows an exemplary sequence diagram illustrating a method of informing type/category for dual/multi USIM device to network in accordance with some embodiments of the present disclosure.

FIG. 8 shows an exemplary sequence diagram illustrating a method of informing type/category for dual/multi USIM device to a network in accordance with some embodiments of the present disclosure.

There are multiple types of MUSIM devices with various capabilities. The UE may be categorized in one of the below classifications based on its hardware capability:

Dual SIM Dual Standby (DSDS)
Dual SIM Dual Receive (DSDR)
  Any RAT combination DSDR capability
  Same RAT combination DSDR capability
    Dual connectivity-based Band combinations supported.
    All band combinations supported.
Dual SIM Dual Active (DSDA)

As the MUSIM devices and single USIM devices request services from the network, the network should be aware of the type and/or category of the MUSIM device, which may help the network for optimized resource allocation. FIG. 8 discloses a method to communicate type/category for dual/multi USIM device to the network.

With reference to FIG. 8, the UE may comprise MUSIM operating in a wireless communication system. In an embodiment, the UE may handle two USIM, i.e., SIM1 $101_1$ and SIM2 $101_2$ (not shown in FIG. 8). In another embodiment, the UE may handle more than two USIM. In FIG. 8, SIM1 $101_1$ may be associated to NW1 103. At step 801, NW1 103 (Additionally or alternatively, referred here as NW) may send a request inquiring about the UE capability type to SIM1 $101_1$ of the UE. At step 803, the UE may send information on the UE capability type to the NW1 103 when a request inquiring about the UE capability type is received from the NW1 103. In an embodiment, the UE may send the information on the UE capability type to the NW1 103 from SIM1 $101_1$ during the registration of the MUSIM with the NW1 103. The UE capability type may comprise one of DSDS type, DSDR type and DSDA type. In an embodiment, when there is a change in the UE capability type, the UE may send information regarding the change in the UE capability type to the NW1 103 from SIM1 $101_1$.

In another embodiment, the above-mentioned steps performed by the UE may, Additionally or alternatively, be applicable for SIM2 $101_2$ associated to the NW2 for informing type/category for dual/multi USIM device to the NW2.

Figure 9:
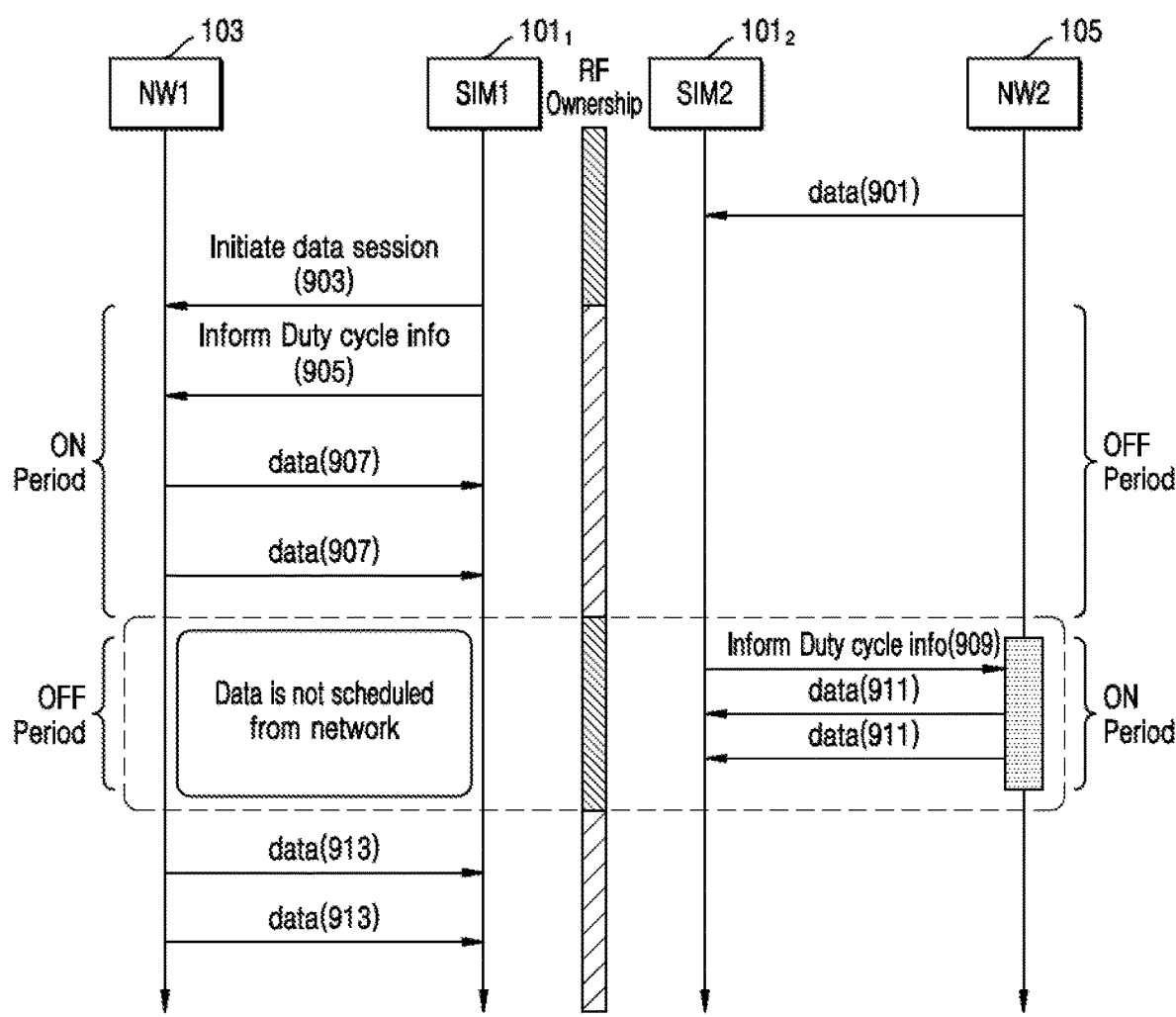
FIG. 9 shows an exemplary sequence diagram illustrating a method to support simultaneous PS (Packet Switched) data sessions on two or more USIMs to increase network and the UE performance in accordance with some embodiments of the present disclosure.

FIG. 9 shows an exemplary sequence diagram illustrating a method to support simultaneous PS (Packet Switched) data sessions on two or more USIMs to increase network and the UE performance in accordance with some embodiments of the present disclosure.

In some cases, a MUSIM user may start and continue a data session on one USIM while another USIM is also in a connected state (for example: no connection release after call). To maintain a connection and the data session, radio frequency circuitry is shared by both USIMs in a time multiplexed manner based on UE specific implementation as there is no support from a 3GPP standardization perspective. Since the network involved in the data session is not aware of the UE temporarily moving to another network, the network continues to allocate resources for the data session, which may not be used by the UE. Once the UE moves back to the network associated with the data session, the UE may recover through retransmissions. To maintain the fairness of allocation, this may lead to a penalty to the UE from the associated network of not using the allocated resources, causing KPI degradation in subsequent resource allocations. To overcome the above-mentioned embodiment, FIG. 9 discloses a method to increase the performance of the UE and network when the UE is in a CONNECTED state in two or more USIMs for a PS data session.

With reference to the FIG. 9, the UE may comprise a MUSIM operating in a wireless communication system. In an example embodiment, the UE may handle two USIM, i.e., SIM1 $101_1$ and SIM2 $101_2$ as shown in FIG. 9. In another embodiment, the UE may handle more than two USIM. In FIG. 9, SIM1 $101_1$ may be associated with NW1 103. Additionally or alternatively, SIM2 $101_2$ may be associated with NW2 105. The NW1 103 and the NW2 105 may belong to a different network service provider or to a same network service provider. The SIM1 $101_1$ may receive parameters of a first paging cycle configuration in a first broadcast information from the NW1 103 and the SIM2 105 may receive parameters of a second paging cycle configuration in a second broadcast information from the NW2 $101_2$ (not shown in FIG. 9). The parameters of the first paging cycle configuration may comprise at least a paging periodicity, wherein the paging periodicity is the number of paging message repetitions during a time period over several paging cycles of the first paging cycle configuration. The parameters of the second paging cycle configuration may comprise at least a paging periodicity, wherein the paging periodicity is the number of paging message repetitions during a time period over several paging cycles of the second paging cycle configuration. The UE may register of SIM1 $101_1$ with NW1 103 and registration of SIM2 $101_2$ with NW2 105 (not shown in FIG. 9). At step 901, the UE may continue the data session with NW2 105 that may have initiated earlier. At step 903, the UE may initiate the data session with NW1 103 from SIM1 $101_1$. The UE detects ongoing data sessions on both SIM1 $101_1$ associated with NW1 103 and SIM2 $101_2$ associated with NW2 105 and calculates the duty cycle for SIM1 $101_1$ and SIM2 $101_2$. This duty cycle contains information about the ON period and the OFF period for each USIM estimated based on the type of service, signal conditions, Buffer Occupancy and other parameters that are not just limited to mention here.

The ON period of a USIM defines the availability of radio frequency circuitry in terms of a number of time slots along with start and end radio frame number. Similarly, the OFF period of a USIM defines the non-availability of radio frequency circuitry in terms of a number of time slots along with start and end radio frame number. At step 905, the SIM1 $101_1$ may send the calculated duty cycle information to the NW1 103. Subsequently, at step 907, the SIM1 $101_1$ may communicate data with the NW1 103 as the radio frequency circuitry is available for communication. The steps 903 to 907 may be referred to as the ON period for SIM1 $101_1$ as communication happens between the SIM1 $101_1$ and NW1 103. At the end of the ON period for SIM1 $101_1$, the radio frequency circuitry communicates with NW2 105 from SIM2 $101_2$. The communication is the start of the OFF period for SIM1 $101_1$ At step 909, the SIM2 $101_2$ may send the calculated duty cycle information to the NW2 105. Subsequently, at step 911, the SIM2 $101_2$ may communicate data with the NW2 105 till the end of its ON period. The steps 909 to 911 may be referred to as the ON period as communication happens between the SIM2 $101_2$ and NW2 105. During this time, there is no data scheduled between SIM1 $101_1$ and NW1 103. This period may be referred to as the OFF period for SIM1 $101_1$. Once the ON period between the SIM2 $101_2$ and the NW2 105 is over, the SIM1 $101_1$ may resume data communication with NW1 103 at step 913. In an embodiment, the network may stop scheduling the resources during the OFF period. In another embodiment, the network may temporarily suspend the ongoing connection during the OFF period. In yet another embodiment, the network may, Additionally or alternatively, enable C-DRX configuration in accordance with the shared duty cycle information. As a result, the approach presented with reference to FIG. 9 helps to prevent wastage of network resources.

Figure 10:
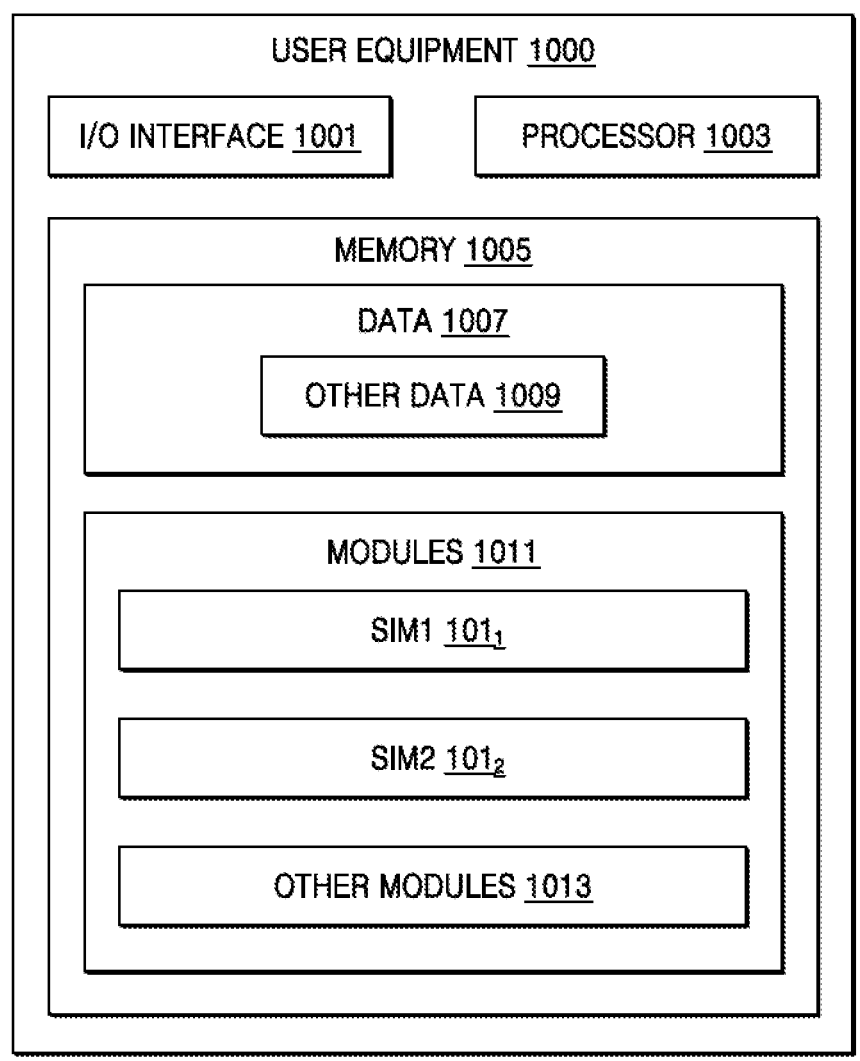
FIG. 10 shows a detailed block diagram of a UE for operating MUSIM in a wireless communication system in accordance with some embodiments of the present disclosure.

FIG. 10 shows a detailed block diagram of a UE for operating MUSIM in a wireless communication system in accordance with some embodiments of the present disclosure.

UE 1000 may include an I/O interface 1001, processor 1003, data 1007, and one or more modules 1011, which are described herein in detail. In the embodiment, the data 1007 may be stored within the memory 1005. The data 1007 may include, for example, other data 1009.

In an embodiment, the I/O interface 1001 may be configured to communicate with at least one of the NW1 103 and/or the NW2 105. In an embodiment, the I/O interface 1001 may be configured to communicate with more than two networks. The I/O interface 1001 while communicating with the NW1 and NW2 may employ communication protocols/methods such as, without limitation, Radio frequency (RF) antennas, cellular (e.g., Code-division multiple access (CDMA), High-speed packet access (HSPA+), Global system for mobile communications (GSM), Long-term evolution (LTE), Worldwide interoperability for microwave access (WiMax), or the like.

The memory 1005 may be communicatively coupled to the processor 1003 of the UE 1000. The memory 1005 may, Additionally or alternatively, store processor instructions, which may cause the processor 1003 to execute the instructions for MUSIM operating in a wireless communication system. The memory 1005 may include, without limitation, memory drives, removable disc drives, etc. The memory drives may further include a drum, magnetic disc drive, magneto-optical drive, optical drive, Redundant Array of Independent Discs (RAID), solid-state memory devices, solid-state drives, etc.

The processor 1003 may include at least one data processor for a MUSIM operation in a wireless communication system. The processor 1003 may include specialized processing units such as integrated system (bus) controllers, memory management control units, floating-point units, graphics processing units, digital signal processing units, etc.

The other data 1009 may store data, including temporary data and temporary files, generated by modules 1011 for performing various functions of the UE 1000.

In the embodiment, the one or more modules 1011 may be implemented as dedicated hardware units. In some implementations, the one or more modules 1011 may be communicatively coupled to the processor 1003 for performing one or more functions of the UE 1000. The modules 1011, when configured with the functionality defined in the present disclosure, results in the hardware of the present disclosure.

In one implementation, the one or more modules 1011 may include, but are not limited to, the SIM1 $101_1$ and SIM2 $101_2$. Here, SIM refers to Subscriber Identity Module or Universal Subscriber Identity Module. In an embodiment, the one or more modules 1011 may include more than two USIM. The one or more modules 1011 may, Additionally or alternatively, include other modules 1013 to perform various miscellaneous functionalities of the UE 1000.

The UE 1000 may handle two USIM i.e., SIM1 $101_1$ and SIM2 $101_2$. SIM1 $101_1$ may be associated with a first Network entity (NW1) 103 and SIM2 $101_2$ may be associated with a second Network entity (NW2) 105. The NW1 103 and the NW2 105 may belong to a different network service provider or to a same network service provider.

Figure 11A:
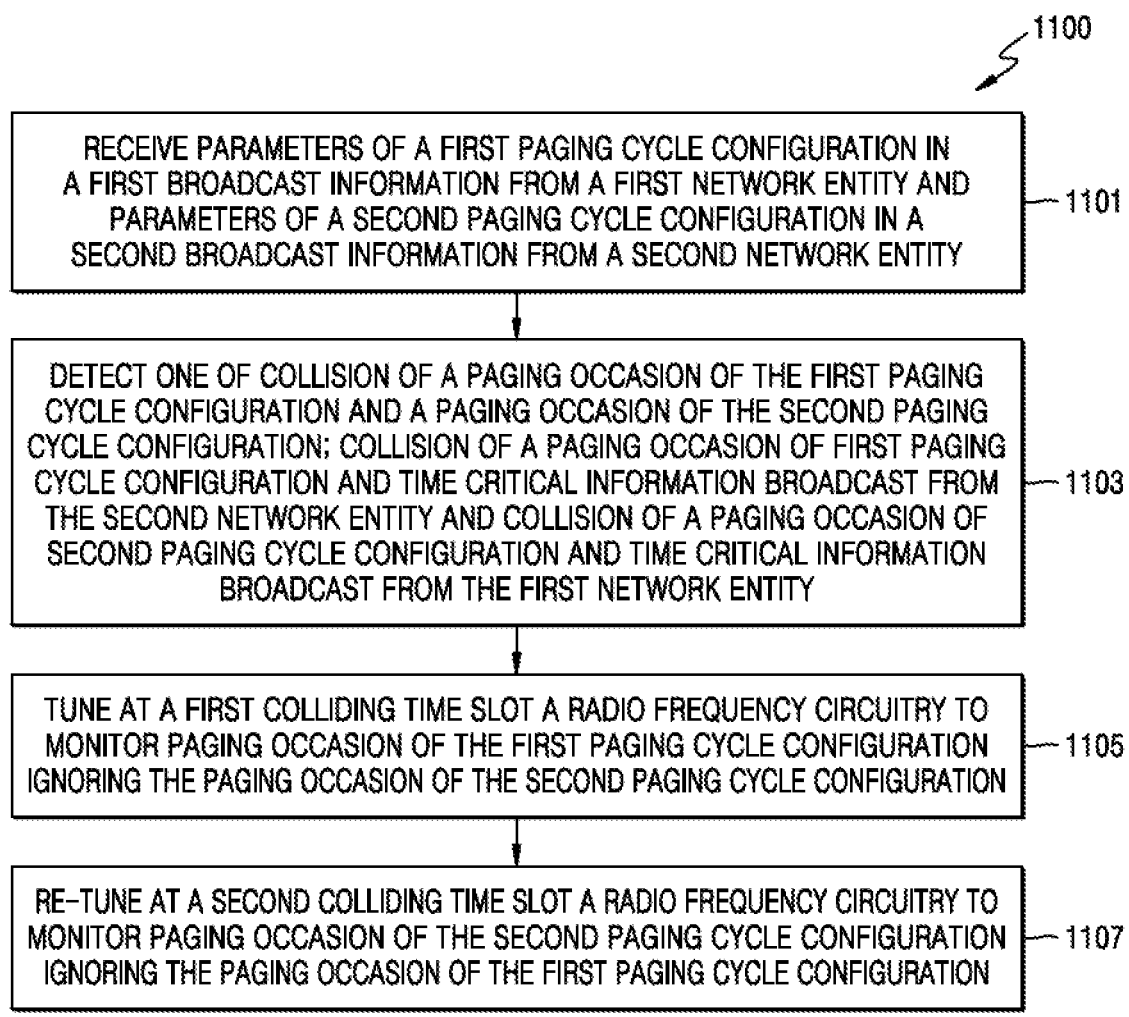
FIG. 11a-11c illustrate flowcharts showing a method for MUSIM in a UE operating in a wireless communication system in accordance with some embodiments of the present disclosure.
Figure 11B:
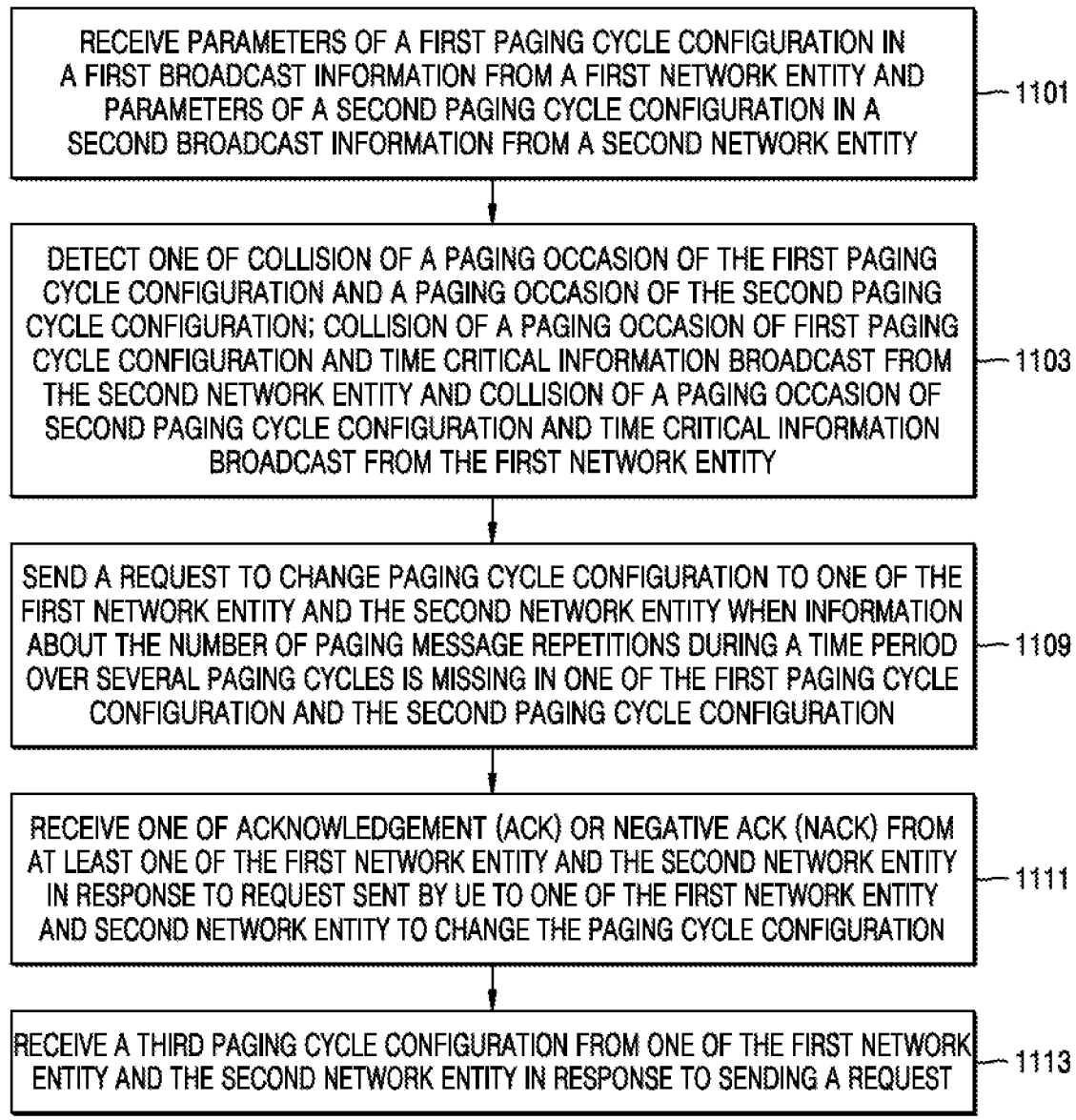
Figure 11C:
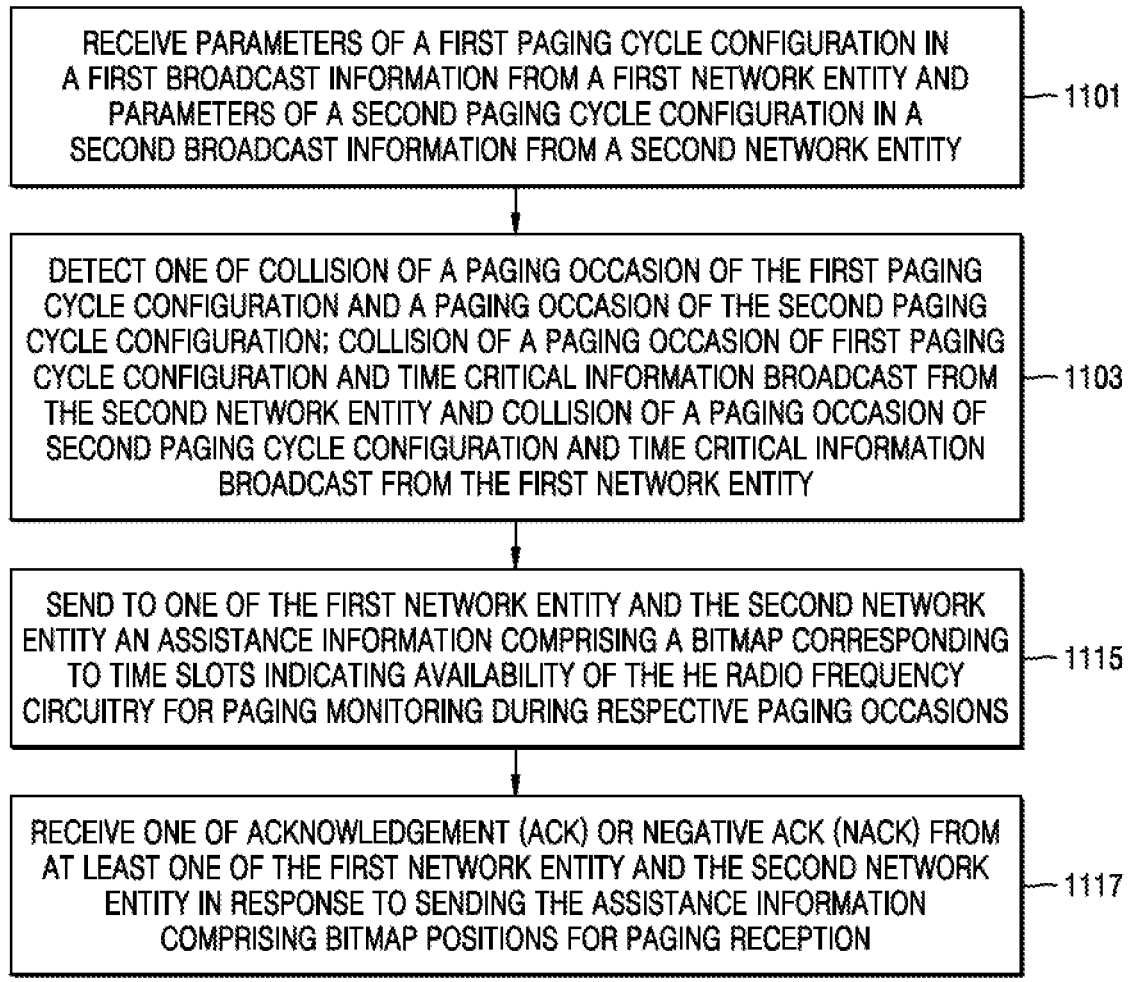

FIGS. 11a-11c illustrate flowcharts showing a method for MUSIM in a UE operating in a wireless communication system in accordance with some embodiments of the present disclosure.

As illustrated in the FIGS. 11a-11c, the method 1100 includes one or more blocks for MUSIM in a UE operating in a wireless communication system. The method 1100 may be described in the general context of computer executable instructions. Generally, computer executable instructions can include routines, programs, objects, components, data structures, procedures, units, and functions, which perform particular functions or implement particular abstract data types.

The order in which the method 1100 is described is not intended to be construed as a limitation, and any number of the described method blocks can be combined in any order to implement the method. Additionally or alternatively, individual blocks may be deleted from the methods without departing from the scope of the subject matter described herein. Furthermore, the method can be implemented in any suitable hardware, software, firmware, or combination thereof.

Below description is with reference to FIG. 11a.

At block 1101, the UE 1000 may receive parameters of a first paging cycle configuration in a first broadcast information from a first network entity and parameters of a second paging cycle configuration in a second broadcast information from a second network entity.

The parameters may comprise at least a paging periodicity and number of paging message repetitions during a time period over several paging cycles. Furthermore, the first network entity and the second network entity may belong to a different network service provider or to a same network service provider.

At block 1103, the UE 1000 may detect one of a collision of a paging occasion of the first paging cycle configuration and a paging occasion of the second paging cycle configuration, a collision of a paging occasion of first paging cycle configuration and time-critical information broadcast from the second network entity, and a collision of a paging occasion of second paging cycle configuration and time-critical information broadcast from the first network entity.

The detecting collision of a paging occasion of the first paging cycle configuration and a paging occasion of the second paging cycle configuration may comprise determining, by the UE 1000, time slot within a radio frame calculated according to the first paging cycle configuration and the UE identifier allocated by the first network entity matching the time slot within a radio frame calculated according to the second paging cycle configuration and the UE identifier allocated by the second network entity.

The detecting collision of a paging occasion of first paging cycle configuration and time-critical information broadcast from the second network entity may comprise determining, by the UE 1000, time slot within a radio frame calculated according to the first paging cycle configuration and the UE identifier allocated by the first network entity matching at least one-time slot within a time window where time-critical information associated the second network entity is broadcasted; and prioritizing, by the UE 1000, reception of paging message in the time slot corresponding to the paging occasion of first paging cycle configuration.

The detecting collision of a paging occasion of second paging cycle configuration and time-critical information broadcast from the first network entity may comprise determining, by the UE 1000, the time slot within a radio frame calculated according to the second paging cycle configuration and the UE identifier allocated by the second network entity matching at least one-time slot within a time window where time-critical information associated the first network entity is broadcasted; and prioritizing, by the UE 1000, the reception of paging message in the time slot corresponding to the paging occasion of second paging cycle configuration.

The time-critical information broadcast may comprise of occasions related to System Information Block (SIBs) scheduling window, Cell Broadcast Service (CBS) transmission window, Multimedia Broadcast Multicast Service (MBMS) transmission time slots and Observed Time Difference Of Arrival (OTDOA) measurements.

At block 1105, the UE 1000 may tune at a first colliding time slot a radio frequency circuitry to monitor the paging occasion of the first paging cycle configuration ignoring the paging occasion of the second paging cycle configuration.

At block 1107, the UE 1000 may re-tune at a second colliding time slot a radio frequency circuitry to monitor the paging occasion of the second paging cycle configuration ignoring the paging occasion of the first paging cycle configuration.

Below description is with reference to FIG. 11*b*.

At block 1101, the UE 1000 may receive parameters of a first paging cycle configuration in a first broadcast information from a first network entity and parameters of a second paging cycle configuration in a second broadcast information from a second network entity.

The parameters may comprise at least a paging periodicity and number of paging message repetitions during a time period over several paging cycles. Furthermore, the first network entity and the second network entity may belong to a different network service provider or to a same network service provider.

At block 1103, the UE 1000 may detect one of a collision of a paging occasion of the first paging cycle configuration and a paging occasion of the second paging cycle configuration, a collision of a paging occasion of first paging cycle configuration and time-critical information broadcast from the second network entity, and a collision of a paging occasion of second paging cycle configuration and time-critical information broadcast from the first network entity.

The detecting collision of a paging occasion of the first paging cycle configuration and a paging occasion of the second paging cycle configuration may comprise determining, by the UE 1000, time slot within a radio frame calculated according to the first paging cycle configuration and the UE identifier allocated by the first network entity matching the time slot within a radio frame calculated according to the second paging cycle configuration and the UE identifier allocated by the second network entity.

The detecting collision of a paging occasion of first paging cycle configuration and time-critical information broadcast from the second network entity may comprise determining, by the UE 1000, time slot within a radio frame calculated according to the first paging cycle configuration and the UE identifier allocated by the first network entity matching at least one-time slot within a time window where time-critical information associated the second network entity is broadcasted; and prioritizing, by the UE 1000, reception of paging message in the time slot corresponding to the paging occasion of first paging cycle configuration.

The detecting collision of a paging occasion of second paging cycle configuration and time-critical information broadcast from the first network entity may comprise determining, by the UE 1000, the time slot within a radio frame calculated according to the second paging cycle configuration and the UE identifier allocated by the second network entity matching at least one-time slot within a time window where time-critical information associated the first network entity is broadcasted; and prioritizing, by the UE 1000, the reception of paging message in the time slot corresponding to the paging occasion of second paging cycle configuration.

The time-critical information broadcast may comprise of occasions related to System Information Block (SIBs) scheduling window, Cell Broadcast Service (CBS) transmission window, Multimedia Broadcast Multicast Service (MBMS) transmission time slots and Observed Time Difference Of Arrival (OTDOA) measurements.

At block 1109, the UE 1000 may send a request to change paging cycle configuration to one of the first network entity and the second network entity when information about the number of paging message repetitions during a time period over several paging cycles is missing in one of the first paging cycle configuration and the second paging cycle configuration.

At block 1111, the UE 1000 may receive one of an Acknowledgement (ACK) or a Negative ACK (NACK) from at least one of the first network entity and the second network entity in response to a request sent by UE to one of the first network entity and second network entity to change the paging cycle configuration.

At block 1113, the UE 1000 may receive a third paging cycle configuration from one of the first network entity and the second network entity in response to sending a request.

The third paging cycle configuration may comprise at least a new paging periodicity, a time offset for the determining the time slot associated with paging occasion and a number of paging message repetitions during a time period over several paging cycles of the third paging cycle configuration.

Below description is with reference to FIG. 11*c*.

At block 1101, the UE 1000 may receive parameters of a first paging cycle configuration in a first broadcast information from a first network entity and parameters of a second paging cycle configuration in a second broadcast information from a second network entity.

The parameters may comprise at least a paging periodicity and number of paging message repetitions during a time period over several paging cycles. Furthermore, the first network entity and the second network entity may belong to a different network service provider or to a same network service provider.

At block 1103, the UE 1000 may detect one of a collision of a paging occasion of the first paging cycle configuration and a paging occasion of the second paging cycle configuration, a collision of a paging occasion of first paging cycle configuration and time-critical information broadcast from the second network entity, and a collision of a paging occasion of second paging cycle configuration and time-critical information broadcast from the first network entity.

The detecting collision of a paging occasion of the first paging cycle configuration and a paging occasion of the second paging cycle configuration may comprise determining, by the UE 1000, time slot within a radio frame calculated according to the first paging cycle configuration and the UE identifier allocated by the first network entity matching the time slot within a radio frame calculated according to the second paging cycle configuration and the UE identifier allocated by the second network entity.

The detecting collision of a paging occasion of first paging cycle configuration and time-critical information broadcast from the second network entity may comprise determining, by the UE 1000, time slot within a radio frame calculated according to the first paging cycle configuration and the UE identifier allocated by the first network entity matching at least one-time slot within a time window where time-critical information associated the second network entity is broadcasted; and prioritizing, by the UE 1000, reception of paging message in the time slot corresponding to the paging occasion of first paging cycle configuration.

The detecting collision of a paging occasion of second paging cycle configuration and time-critical information broadcast from the first network entity may comprise determining, by the UE 1000, the time slot within a radio frame calculated according to the second paging cycle configuration and the UE identifier allocated by the second network entity matching at least one-time slot within a time window where time-critical information associated the first network entity is broadcasted. Additionally or alternatively, The detecting collision may comprise prioritizing, by the UE 1000, the reception of paging message in the time slot corresponding to the paging occasion of second paging cycle configuration.

The time-critical information broadcast may comprise of occasions related to System Information Block (SIBs) scheduling window, Cell Broadcast Service (CBS) transmission window, Multimedia Broadcast Multicast Service (MBMS) transmission time slots and Observed Time Difference Of Arrival (OTDOA) measurements.

At block 1115, the UE 1000 may send to one of the first network entity and the second network entity assistance information comprising a bitmap corresponding to time slots indicating the availability of the UE radio frequency circuitry for paging monitoring during respective paging occasions.

At block 1117, the UE 1000 may receive one of an Acknowledgement (ACK) or a Negative ACK (NACK) from at least one of the first network entity and the second network entity in response to sending the assistance information comprising bitmap positions for paging reception.

Furthermore, one or more computer-readable storage media may be utilized in implementing embodiments consistent with the present disclosure. A computer-readable storage medium refers to any type of physical memory on which information or data readable by a processor may be stored. Therefore, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The described operations may be implemented as a method, system, or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include computer-readable media except for a transitory. The code implementing the described operations may further be implemented in hardware logic (e.g., an integrated circuit chip, Programmable Gate Array (PGA), Application Specific Integrated Circuit (ASIC), etc.).

The terms "an embodiment", "embodiment", "embodiments", "the embodiment", "the embodiments", "one or more embodiments", "some embodiments", and "one embodiment" mean "one or more (but not all) embodiments of the present disclosure(s)" unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an", and "the" mean "one or more", unless expressly specified otherwise.

A description of an embodiment with several components in communication with each other does not imply that all such components are required. On the contrary, a variety of optional components are described to illustrate the wide variety of possible embodiments of the present disclosure.

When a single device or article is described herein, it will be readily apparent that more than one device/article (whether or not the device or article cooperate) may be used in place of a single device/article. Similarly, where more than one device or article is described herein (whether or not the device or article cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as with such functionality/features. Therefore, other embodiments of the present disclosure do not include the device itself The illustrated operations of FIGS. 11a, 11b, and 11c show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and the language may not have been selected to delineate or circumscribe the inventive subject matter. It is therefore intended that the scope of the present disclosure be limited not by this detailed description, but rather by any claims that issue on an application based here on. Accordingly, the disclosure of the embodiments of the present disclosure is intended to be illustrative, but not limiting, of the scope of the present disclosure, which is set forth in the following claims.

REFERRAL NUMERALS

| Reference number | Description |
| --- | --- |
| $101_1$ | SIM1 of UE |
| $101_2$ | SIM2 of UE |
| 103 | Network 1 (NW1) |
| 105 | Network 2 (NW2) |
| 1000 | User Equipment |
| 1001 | I/O interface |
| 1003 | Processor |
| 1005 | Memory |
| 1007 | Data |
| 1009 | Other data |
| 1011 | Modules |
| 1013 | Other modules |

We claim:

1. A method for a Multi-Universal Subscriber Identity Module (MUSIM) User Equipment (UE) operating in a wireless communication system, the method comprising:
receiving, by the UE, parameters of a first paging cycle configuration in a first broadcast information from a first network entity and a second paging cycle configuration in a second broadcast information from a second network entity;
detecting, by the UE, one of,
a collision of a paging occasion of the first paging cycle configuration and a paging occasion of the second paging cycle configuration;
a collision of the paging occasion of the first paging cycle configuration and a time-critical information broadcast from the second network entity, and
a collision of a paging occasion of the second paging cycle configuration and a time-critical information broadcast from the first network entity; and
sending, by the UE, a request to change the first paging cycle configuration or the second paging cycle configuration to the first network entity or the second network entity when information about a number of paging message repetitions during a time period over several paging cycles is missing in one of the first paging cycle configuration and the second paging cycle configuration.

2. The method as claimed in claim 1, wherein the parameters comprise at least a paging periodicity and the number of paging message repetitions during the time period over several paging cycles.

3. The method as claimed in claim 1, wherein the detecting the collision of the paging occasion of the first paging cycle configuration and the paging occasion of the second paging cycle configuration comprises:
determining, by the UE, a time slot within a radio frame calculated according to the first paging cycle configuration and a UE identifier allocated by the first network entity matching the time slot within a radio frame calculated according to the second paging cycle configuration and the UE identifier allocated by the second network entity.

4. The method as claimed in claim 3, further comprises:
tuning, by the UE at a first colliding time slot, a radio frequency circuitry to monitor the paging occasion of the first paging cycle configuration while ignoring the paging occasion of the second paging cycle configuration; and
re-tuning, by the UE at a second colliding time slot, the radio frequency circuitry to monitor the paging occasion of the second paging cycle configuration while ignoring the paging occasion of the first paging cycle configuration.

5. The method as claimed in claim 3, further comprising:
receiving, by the UE, a third paging cycle configuration from one of the first network entity and the second network entity in response to sending the request.

6. The method as claimed in claim 5, wherein the third paging cycle configuration comprises at least a new paging periodicity, a time offset for the determining the time slot associated with a paging occasion and a number of paging message repetitions during a time period over several paging cycles of the third paging cycle configuration.

7. The method as claimed in claim 3, further comprises:
sending, by the UE to one of the first network entity and the second network entity, assistance information comprising a bitmap corresponding to time slots indicating availability of UE radio frequency circuitry for paging monitoring during respective paging occasions.

8. The method as claimed in claim 1, wherein the detecting the collision of the paging occasion of the first paging cycle configuration and the time-critical information broadcast from the second network entity comprises:
determining, by the UE, a time slot within a radio frame calculated according to the first paging cycle configuration and a UE identifier allocated by the first network entity matching at least one-time slot within a time window where time-critical information associated with the second network entity is broadcast; and
prioritizing, by the UE, reception of a paging message in a time slot corresponding to the paging occasion of the first paging cycle configuration.

9. The method as claimed in claim 1, wherein the detecting the collision of the paging occasion of second paging cycle configuration and the time-critical information broadcast from the first network entity comprises:
determining, by the UE, a time slot within a radio frame calculated according to the second paging cycle configuration and a UE identifier allocated by the second network entity matching at least one-time slot within a time window where time-critical information associated with the first network entity is broadcast; and
prioritizing, by the UE, reception of a paging message in a time slot corresponding to the paging occasion of the second paging cycle configuration.

10. A User Equipment (UE) with a Multi-Universal Subscriber Identity Module (MUSIM) operating in a wireless communication system, the UE comprising:
a processor; and
a memory communicatively coupled to the processor, wherein the memory stores processor-executable instructions, which on execution, cause the processor to:
receive parameters of a first paging cycle configuration in a first broadcast information from a first network entity and a second paging cycle configuration in a second broadcast information from a second network entity;
detect one of: a collision of a paging occasion of the first paging cycle configuration and a paging occasion of the second paging cycle configuration; a collision of the paging occasion of first paging cycle configuration and a time-critical information broadcast from the second network entity and a collision of the paging occasion of second paging cycle configuration and a time-critical information broadcast from the first network entity; and send, to one of the first network entity and the second network entity, assistance information comprising a bitmap corresponding to time slots indicating availability of UE radio frequency circuitry for paging monitoring during respective paging occasions.

11. The UE as claimed in claim 10, wherein the parameters comprise at least a paging periodicity and number of paging message repetitions during a time period over several paging cycles.

12. The UE as claimed in claim 10, wherein the UE causes the processor to:

determine a time slot within a radio frame calculated according to the first paging cycle configuration and a UE identifier allocated by the first network entity matching a time slot within a radio frame calculated according to the second paging cycle configuration and a UE identifier allocated by the second network entity.

13. The UE as claimed in claim 12, wherein the UE causes the processor to:

tune, at a first colliding time slot, a radio frequency circuitry to monitor the paging occasion of the first paging cycle configuration while ignoring the paging occasion of the second paging cycle configuration;

re-tune, at a second colliding time slot, the radio frequency circuitry to monitor the paging occasion of the second paging cycle configuration while ignoring the paging occasion of the first paging cycle configuration; and send a request to change the first paging cycle configuration or the second paging cycle configuration to the first network entity or the second network entity when information about a number of paging message repetitions during a time period over several paging cycles is missing in one of: the first paging cycle configuration and the second paging cycle configuration.

14. The UE as claimed in claim 13, wherein the UE causes the processor to:

receive a third paging cycle configuration from one of the first network entity and the second network entity in response to sending the request.

15. The UE as claimed in claim 14, wherein the third paging cycle configuration comprises at least a new paging periodicity, a time offset for the determining the time slot, and a number of paging message repetitions during a time period over several paging cycles of the third paging cycle configuration.

16. The UE as claimed in claim 10, wherein the UE causes the processor to:

determine a time slot within a radio frame calculated according to the first paging cycle configuration and a UE identifier allocated by the first network entity matching at least one-time slot within a time window where time-critical information associated the second network entity is broadcast, and prioritize reception of paging messages in a time slot corresponding to the paging occasion of first paging cycle configuration.

17. The UE as claimed in claim 10, wherein the UE causes the processor to:

determine a time slot within a radio frame calculated according to the second paging cycle configuration and a UE identifier allocated by the second network entity matching at least one-time slot within a time window where time-critical information associated the first network entity is broadcast, and prioritize reception of paging messages in a time slot corresponding to the paging occasion of second paging cycle configuration.

* * * * *